(12) United States Patent
Kudo et al.

(10) Patent No.: US 9,276,652 B2
(45) Date of Patent: Mar. 1, 2016

(54) WIRELESS COMMUNICATION SYSTEM AND WIRELESS COMMUNICATION METHOD

(75) Inventors: Riichi Kudo, Yokosuka (JP); Munehiro Matsui, Yokosuka (JP); Tomoki Murakami, Yokosuka (JP); Takeo Ichikawa, Yokosuka (JP); Yusuke Asai, Yokosuka (JP); Koichi Ishihara, Yokosuka (JP); Tomoyuki Yamada, Yokosuka (JP); Masato Mizoguchi, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 194 days.

(21) Appl. No.: 13/881,525

(22) PCT Filed: Nov. 15, 2011

(86) PCT No.: PCT/JP2011/076252
§ 371 (c)(1),
(2), (4) Date: Apr. 25, 2013

(87) PCT Pub. No.: WO2012/067093
PCT Pub. Date: May 24, 2012

(65) Prior Publication Data
US 2013/0208619 A1    Aug. 15, 2013

(30) Foreign Application Priority Data

Nov. 16, 2010  (JP) ................................ 2010-256077
Apr. 12, 2011  (JP) ................................ 2011-088264

(51) Int. Cl.
*H04B 7/04*    (2006.01)
*H04L 5/00*    (2006.01)
(Continued)

(52) U.S. Cl.
CPC ............ *H04B 7/0452* (2013.01); *H04B 7/0617* (2013.01); *H04L 5/0023* (2013.01);
(Continued)

(58) Field of Classification Search
USPC .......................... 370/328, 252; 455/11.11, 69
See application file for complete search history.

(56) References Cited

U.S. PATENT DOCUMENTS

2006/0003697 A1\*  1/2006  Asai et al. .................... 455/11.1
2007/0242621 A1\*  10/2007  Nandagopalan et al. ..... 370/254
(Continued)

FOREIGN PATENT DOCUMENTS

JP    2002-246970 A    8/2002
JP    2003-087189 A    3/2003
(Continued)

OTHER PUBLICATIONS

QH Spencer etc., "An introduction to the multi-user MIMO downlink", IEEE Communication Magazine, pp. 60-67, Oct. 2004.
(Continued)

*Primary Examiner* — Vinncelas Louis
(74) *Attorney, Agent, or Firm* — Harness, Dickey & Pierce, P.L.C.

(57) ABSTRACT

A wireless communication system includes a first wireless station including antenna elements, transmission units corresponding to the antenna elements, and a transmission directivity control unit that controls transmission directivity of the antenna elements, and second wireless stations each including a reception power measurement unit that measures a reception power. The transmission directivity control unit determines the transmission directivity of each of the antenna elements so that a signal does not reach a particular second wireless station among the second wireless stations. The transmission units generate wireless signals using the transmission directivity. The antenna elements transmit the generated wireless signals. The reception power measurement unit measures the reception power in a period that is set so that a signal does not reach the particular second wireless station by using the directivity, and detect the presence or absence of interference caused by the low accuracy of channel information.

16 Claims, 29 Drawing Sheets

(51) Int. Cl.
*H04B 7/06* (2006.01)
*H04W 16/28* (2009.01)
*H04W 24/10* (2009.01)
*H04B 17/318* (2015.01)

(52) U.S. Cl.
CPC ............ *H04L5/0053* (2013.01); *H04L 5/0057* (2013.01); *H04B 17/318* (2015.01); *H04W 16/28* (2013.01); *H04W 24/10* (2013.01)

(56) References Cited

U.S. PATENT DOCUMENTS

2009/0016263 A1* 1/2009 Kishigami et al. ............ 370/328
2010/0027513 A1* 2/2010 Ikeda ............................ 370/337
2010/0159844 A1* 6/2010 Yamazaki et al. .............. 455/69

FOREIGN PATENT DOCUMENTS

| | | |
|---|---|---|
| JP | 2005-525041 A | 8/2005 |
| JP | 2007-180856 A | 7/2007 |
| JP | 2010-171734 A | 8/2010 |
| WO | WO-03/096560 A1 | 11/2003 |

OTHER PUBLICATIONS

Robert Stacey, IEEE, "Proposed specification framework for TGac", doc.: IEEE 802.11-09/0992r21, Jan. 2011.

International Search Report for PCT/JP2011/076252, mailed Dec. 13, 2011.

* cited by examiner

FIG. 23

| TRANSMISSION RATE | MODULATION SCHEME | CODING RATE |
| --- | --- | --- |
| 6Mbps | BPSK | 1/2 |
| 12Mbps | QPSK | 1/2 |
| 24Mbps | 16-QAM | 1/2 |
| 36Mbps | 16-QAM | 3/4 |
| 54Mbps | 64-QAM | 3/4 |

WIRELESS COMMUNICATION SYSTEM AND WIRELESS COMMUNICATION METHOD

CROSS-REFERENCE TO RELATED APPLICATIONS

This application is a 371 U.S. National Stage of International Application No. PCT/JP2011/076252, filed Nov. 15, 2011 and published in Japanese as WO 2012/067093 on May 24, 2012. This application claims priority to Japanese Patent Application Nos. 2010-256077, filed Nov. 16, 2010 and 2011-088264, filed Apr. 12, 2011. The disclosures of the above applications are incorporated herein by reference.

TECHNICAL FIELD

The present invention relates to a wireless communication system and a wireless communication method. The present invention particularly relates to a wireless communication system and a wireless communication method using space division multiple access control technology. Moreover, the present invention particularly relates to transmission technology in a wireless communication system that simultaneously communicates with a plurality of communication parties using spatial multiplexing.

Priority is claimed on Japanese Patent Application No. 2010-256077, filed Nov. 16, 2010 and Japanese Patent Application No. 2011-088264, filed Apr. 12, 2011, the contents of which are incorporated herein by reference.

BACKGROUND ART

With recent developments such as those in the Internet, networks have been spreading to both homes and offices. Such a network is called a LAN (local area network). A wireless LAN that is a wireless version of the LAN has also been spreading. For example, as a high-speed wireless access system using a 2.4 GHz band or a 5 GHz band, spread of a wireless LAN or the like of the IEEE (Institute of Electrical and Electronics Engineers) 802.11g standard and the IEEE 802.11a standard is remarkable. In these systems, a transmission rate (a transmission rate in a physical layer) of a maximum of 54 Mbit/s has been achieved using an orthogonal frequency division multiplexing (OFDM) modulation scheme, which is technology for stabilizing the property in a multi-path fading environment.

However, the transmission rate cited here is a transmission rate on a physical layer. In fact, since the transmission efficiency in a MAC (medium access control) layer is about 50 to 70%, an upper limit of the actual throughput is about 30 Mbps and this property is further deteriorated when communication parties requiring information increase. On the other hand, in the world of a wired LAN, FTTH (fiber to the home) using an optical fiber, including a 100 Base-T interface of the Ethernet (registered trademark), has been spreading to individual homes, and thus provision of a high-speed line of 100 Mbps has been spreading. Even in the world of wireless LANs, a higher transmission rate is required.

Therefore, as a standard for realizing a higher transmission rate, there is IEEE 802.11n standard. In this standard, a transmission rate of a maximum of 600 Mbit/s can be realized by using MIMO (multiple input multiple output) technology as spatial multiplexing transmission technology.

In recent years, in order to achieve a larger capacity, wireless communication using MU (multi user)-MIMO that enables wireless space resources to be effectively used by performing one-to-many communication through spatial multiplexing between a wireless base station and a plurality of wireless terminal stations using the same wireless channel has been studied as a wireless system using MIMO technology (see, for example, Non-Patent Document 1). For example, an MU-MIMO transmission method has been studied in IEEE 802.11ac (see Non-Patent Document 2).

In MU-MIMO, channel information between antennas of a base station and each of the terminals is estimated; the base station acquires the channel information, controls transmission beams using the acquired channel information, and directs the beams toward the terminals in optimal directions, thereby making it possible to simultaneously transmit signals to the terminals using the same frequency channel.

That is, control has been performed to increase directivity to wireless stations that are transmission destinations and to direct nulls to the other specific wireless stations. Since spatial multiplexing is performed, it is also called a space division multiple access (SDMA) control scheme. Since communication can be simultaneously performed in the same frequency and at the same time, it is possible to increase the spectral efficiency.

PRIOR ART DOCUMENTS

Non-Patent Documents

Non-Patent Document 1: QH Spencer etc., "An introduction to the multi-user MIMO downlink", IEEE Communication Magazine, pp. 60-67, October 2004.

Non-Patent Document 2: IEEE, "Proposed specification framework for TGac", doc.: IEEE 802.11-09/0992r21, January 2011.

SUMMARY OF INVENTION

Problems to be solved by the Invention

However, although the channel information is essential for transmission beam control of wireless communication using MU-MIMO, accuracy of once estimated channel information is not guaranteed after that because the channel state varies due to a surrounding environment using the wireless communication and/or a state (e.g., mobility) of a wireless station.

There is a problem in that the accuracy of the channel information is deteriorated if the channel information is not accurate, so that optimal transmission beam control cannot be performed (a null is not directed to a wireless station to which the null should be directed), interference between wireless stations occurs on a receiving end, and deterioration in communication quality such as increases in packet retransmissions or an increase in the error rate occurs. It is difficult for the wireless station to recognize whether or not the channel information is accurate.

Furthermore, if another base station or another wireless communication system using the same frequency band is present in the vicinity, interference occurs in the same manner as described above. In this case, the communication quality is also deteriorated.

Here, the configuration of a conventional transmission/reception system is illustrated in FIG. 30. In FIG. 30, 101 denotes a base station, 102-1 to 102-*i* denote terminals, 101-1 denotes a data selection/output circuit, 101-2 and 102-1-4 to 102-*i*-4 denote transmission signal generation circuits, 101-3 and 102-1-2 to 102-*i*-2 denote wireless signal transmission/reception circuits, 101-4-1 to 101-4-N, 102-1-1-1 to 102-1-1-M$_i$, and 102-*i*-1-1 to 102-*i*-1-M$_i$ denote transmission/reception antennas, 101-5 and 102-1-3 to 102-*i*-3 denote reception signal demodulation circuits, 101-6 denotes a channel information storage circuit, and 101-7 denotes a transmission method determination circuit. Here, $1 \leq i \leq K$, where K denotes the number of terminals, $M_i$ denotes the number of transmission/reception antennas of an $i^{th}$ terminal, and N denotes the number of transmission/reception antennas of the base station.

Transmission from the base station to the terminals is considered. In the base station 101, the data selection/output circuit 101-1 outputs information on a communication party to which output can be performed to the transmission method determination circuit 101-7. The transmission method determination circuit 101-7 determines the communication party using a communication party selection method, which will be described below, determines a spatial multiplexing order, transmission weights, a modulation scheme, and a coding scheme for the communication party, and outputs them to the data selection/output circuit 101-1 and the transmission signal generation circuit 101-2. In this case, the transmission weights may not be used. The data selection/output circuit 101-1 outputs transmission data destined for the corresponding communication party to the transmission signal generation circuit 101-2. The transmission signal generation circuit 101-2 performs modulation and coding on the input transmission signal, multiplies a resultant signal by the transmission weights, inserts a pilot signal used for signal detection and delivery of communication information, and outputs a resultant signal to the wireless signal transmission/reception circuit 101-3. The wireless signal transmission/reception circuit 101-3 up-converts the input signal to a carrier frequency and transmits a resultant signal via the transmission/reception antennas 101-4-1 to 101-4-N.

For a method for selecting a communication party, a communication party for which data to be transmitted is stored in a memory and transmission is ready to perform may be specified, a communication party corresponding to the oldest data among a plurality of pieces of stored data may be selected, a communication party may be selected based on QoS (quality of service) of a user, a combination of users previously determined by a group ID (identifier) may be selected, or a combination of communication parties having low correlation of channel information may be selected.

K terminals that are communication parties each input a wireless signal received via antennas provided in each terminal to the wireless signal transmission/reception circuit provided in each terminal. In an $i^{th}$ terminal, the wireless signal transmission/reception circuit 102-$i$-2 down-converts the signal received via at least one of the antennas 102-$i$-1-1 to 102-$i$-1-$M_i$ from the carrier frequency, and inputs a resultant signal to the reception signal demodulation circuit 102-$i$-3. The reception signal demodulation circuit 102-$i$-3 establishes synchronization with a received packet, decodes a signal, and outputs data.

On the other hand, in the case in which transmission is performed from a terminal to the base station, when transmission data is input to the terminal, the transmission signal generation circuit 102-$i$-4 adds a control frame such as a pilot signal to the signal subjected to the modulation and coding and outputs a resultant signal to the wireless transmission/reception circuit 102-$i$-2. The wireless transmission/reception circuit 102-$i$-2 up-converts the signal output from the transmission signal generation circuit 102-$i$-4 to the carrier frequency, and transmits a resultant signal through at least one of the transmission/reception antennas 102-$i$-1-1 to 102-$i$-1-$M_i$.

In the base station, the wireless signal transmission/reception circuit 101-3 down-converts the signal received via at least one of the antennas 101-4-1 to 101-4-N and outputs a resultant signal to the reception signal demodulation circuit 101-5. The channel information used for demodulation or fed-back channel information between the terminal and the base station included in a demodulation signal is input to the channel information storage circuit 101-6. The channel information storage circuit 101-6 performs optimization (correction) of the channel information required to generate the transmission weights, such as calibration, on the input channel information, and outputs resultant information to the transmission signal generation circuit 101-2 via the transmission method determination circuit 101-7.

Hereinafter, a BD (block diagonalization) directivity control method will be shown as an example of communication with a plurality of communication parties using a spatial multiplexing scheme. A channel response matrix $H_{i,j}$ (an $M_i \times N$ matrix) representing channel information for a $j^{th}$ frequency channel of the terminal 102-$i$ obtained in the channel information storage circuit 101-6 is divided into a right singular matrix $V_{i,j}$ (an $N \times N$ matrix), a left singular matrix $U_{i,j}$ (an $M_i \times M_i$ matrix), and a matrix D (an $M_i \times N$ matrix) in which diagonal elements are the square roots $\sqrt{\lambda_{i,j,1}}$ of eigenvalues and non-diagonal matrixes are 0, by singular value decomposition, as shown in the following equation:

$$H_{i,j} = \begin{pmatrix} H_{i,j,11} & H_{i,j,12} & \cdots & H_{i,j,1N} \\ H_{i,j,21} & H_{i,j,22} & \cdots & H_{i,j,2N} \\ \vdots & \vdots & \ddots & \vdots \\ H_{i,j,Mi1} & H_{i,j,Mi2} & \cdots & H_{i,j,MiN} \end{pmatrix} \quad \text{[Equation 1]}$$

$$= \begin{pmatrix} U_{i,j,11} & U_{i,j,12} & \cdots & U_{i,j,1Mi} \\ U_{i,j,21} & U_{i,j,22} & \cdots & U_{i,j,2Mi} \\ \vdots & \vdots & \ddots & \vdots \\ U_{i,j,Mi1} & U_{i,j,Mi2} & \cdots & U_{i,j,MiMi} \end{pmatrix}$$

$$\begin{pmatrix} \sqrt{\lambda_{i,j,1}} & 0 & \cdots & 0 \\ 0 & \sqrt{\lambda_{i,j,2}} & & \vdots \\ \vdots & & \ddots & \vdots \\ 0 & \cdots & \cdots & \sqrt{\lambda_{i,j,Mi}} \end{pmatrix} \; 0$$

$$\begin{pmatrix} V_{i,j,11} & V_{i,j,12} & \cdots & V_{i,j,1N} \\ V_{i,j,21} & V_{i,j,22} & \cdots & V_{i,j,2N} \\ \vdots & \vdots & \ddots & \vdots \\ V_{i,j,N1} & V_{i,j,N2} & \cdots & V_{i,j,NN} \end{pmatrix}^H$$

$$= U_{i,j}(D_{i,j} \; 0) V_{i,j}^H$$

$$= U_{i,j}(D_{i,j} \; 0)(V'_{i,j} \; V''_{i,j})^H$$

$$= U_{i,j} D_{i,j} V'^H_{i,j}$$

Here, $H_{i,j,1k}$ denotes a transfer coefficient between the $1^{th}$ antenna of the transmission device and the $k^{th}$ antenna of the terminal 102-$i$ in the $j^{th}$ frequency channel. In the right singular matrix $V_{i,j}$, $V'_{i,j}$ is a column vector group corresponding to the eigenvalues, and $V''_{i,j}$ is a column vector group corresponding to 0. In eigenvector transmission, which is known as a method that enables the maximum spectral efficiency to be obtained in single-user communication, a signal power represented by a corresponding eigenvalue $\lambda_{i,j,1}$ can be obtained by using a column vector of $V'_{i,j}$ as transmission weights. Here, $\lambda_{i,j,1} \geq \lambda_{i,j,2} \geq \ldots \geq \lambda_{i,j,Mi}$, and a superscript H denotes a complex conjugate matrix.

Next, means for the communication party selection method in accordance with a BD method for multi-users will be shown. Here, communication with K users (the terminals 102-1 to 102-K) is considered. A method for calculating transmission weights for the $i^{th}$ terminal 102-$i$ will be shown. First, an aggregate channel matrix $H^+_{i,j}$ corresponding to the terminals other than the terminal 102-$i$ is defined as:

$$H^+_{i,j} = \begin{pmatrix} R_{1,j}H_{1,j} \\ \vdots \\ R_{i-1,j}H_{i-1,j} \\ R_{i+1,j}H_{i+1,j} \\ \vdots \\ R_{K,j}H_{K,j} \end{pmatrix}$$  [Equation 2]

$R_{a,j}$ is reception weights in the terminal 102-$a$. If $R_{a,j}$ is a diagonal matrix having diagonal elements of 1, it shows a case in which transmission weights are determined without assumption of reception weights. When singular value decomposition is performed on $H^+_{i,j}$, it can be represented as:

$$H_{i,j}^+ = U_{i,j}^+(D_{i,j}^+ 0)(V'^+_{i,j} V''^+_{i,j})^H$$  [Equation 3]

where $V'^+_{i,j}$ is a signal space vector corresponding to eigenvalues $D^+_{i,j}$, and $V''^+_{i,j}$ is a null space vector with no eigenvalue or a null space vector corresponding to an eigenvalue 0. Here, when transmission to the null space that is represented by $V''^+_{i,j}$ is performed, interference does not occur for the reception weights of the communication parties other than the terminal 102-$i$. Thus, weights obtained by performing linear calculation on $V''^+_{i,j}$ obtained here may be used as the transmission weights to be used in the $j^{th}$ frequency channel to perform communication with a plurality of communication parties using the spatial multiplexing scheme. For example, weights obtained by multiplying the channel matrix $H_{i,j}$ corresponding to the terminal 102-$i$ by $V''^+_{i,j}$, and multiplying $V''^+_{i,j}$ by a basis vector obtained using an orthogonalization method with respect to a row vector of obtained $H_{i,j}V''^+_{i,j}$ or a right singular vector obtained by performing singular value decomposition on $H_{i,j}V''^+_{i,j}$ may be used as the transmission weights. If the matrix obtained from $H_{i,j}V''^+_{i,j}$ is $G_{i,j}$, a transmission weight vector may be represented as $V''^+_{i,j}G_{i,j}$.

In this way, transmission weights can be calculated for each communication party, and obtained transmission weights $W_j$ for the $j^{th}$ frequency channel for the K users may be represented as:

$$W_j = (W_{1,j} \; W_{2,j} \; \ldots \; W_{K,j})$$  [Equation 4]
$$= (V''^+_{1,j}G_{1,j} \; V''^+_{2,j}G_{2,j} \; \ldots \; V''^+_{K,j}G_{K,j})$$

A reception signal $y_{i,j}$ corresponding to the $j^{th}$ frequency channel in the terminal 102-$i$ when such transmission weights are used may be represented as:

$$y_{i,j} = R_{i,j}H_{i,j}W_j x_{i,j} + n_{i,j}$$  [Equation 5]
$$= R_{i,j}H_{i,j}W_{i,j}x_{i,j} + \sum_{\substack{l=1 \\ l \neq i}}^{K} R_{i,j}H_{i,j}W_{l,j}x_{l,j} + n_{i,j}$$

Here, $x_{i,j}$ denotes a transmission signal destined for the terminal 102-$i$ transmitted using the $j^{th}$ frequency channel, and $n_{i,j}$ denotes a thermal noise vector in the terminal 102-$i$ in the $j^{th}$ frequency channel. If there is no error in the channel information, $R_{i,j}H_{i,j}$ and $W_{1,j}$ are orthogonal to each other and $R_{i,j}H_{i,j}W_{i,j}$ is 0 (1≠i). However, if there is an error in the channel information of the base station, the second term at the right side in the second line in Equation 5 is not 0, which is inter-user interference, and deteriorates transmission quality. Therefore, it is necessary to estimate SINR taking the quality deterioration into consideration and determine an appropriate modulation scheme, a coding rate, and the number of streams to be subjected to spatial multiplexing.

As described above, when the transmission to the plurality of communication parties using the spatial multiplexing scheme is performed, the inter-user interference occurs due to the channel estimation error, and thus there is a problem in that an appropriate modulation scheme, a coding rate, and the number of spatial multiplexing streams cannot be determined and the throughput is greatly deteriorated.

The present invention has been made in consideration of such circumstances, and an object thereof is to provide a wireless communication system and a wireless communication method capable of preventing communication quality from being deteriorated due to interference caused by low accuracy of channel information or interference caused by another base station or another wireless communication system.

Moreover, an object of the present invention is to provide a wireless communication system capable of evaluating inter-user interference and appropriately selecting a modulation scheme, a coding rate, and the number of spatial streams for each terminal when transmission to a plurality of communication parties using a spatial multiplexing scheme is performed at the same time and in the same frequency.

Means for Solving the Problems

In order to solve the problems described above, the present invention is a wireless communication system including: a first wireless station including a plurality of antenna elements, transmission units corresponding to the plurality of antenna elements, and a transmission directivity control unit that controls transmission directivity of the plurality of antenna elements; and a plurality of second wireless stations each including a reception power measurement unit that measures a reception power, wherein the transmission directivity control unit of the first wireless station determines the transmission directivity of each of the plurality of antenna elements so that a signal does not reach a particular second wireless station among the plurality of second wireless stations, the transmission units generate wireless signals using the transmission directivity, the plurality of antenna elements transmit the generated wireless signals, and the reception power measurement unit of the particular second wireless station measures the reception power in a period that is set so that a signal does not reach the particular second wireless station, and detects the presence or absence of interference.

In the wireless communication system described above, the transmission directivity control unit may periodically switch the particular second wireless station.

In the wireless communication system described above, the transmission directivity control unit may determine the particular second wireless station based on the numbers of times a packet was not delivered in a given period in the plurality of second wireless stations.

In the wireless communication system described above, the transmission directivity control unit may determine the particular second wireless station based on error rates in the plurality of second wireless stations.

In the wireless communication system described above, the transmission directivity control unit may determine, as the particular second wireless station, a second wireless station for which application data to be transmitted is not stored among the plurality of second wireless stations.

In the wireless communication system described above, the particular second wireless station may further include: an interference estimation unit that estimates an interference amount; and a transmission unit that transmits the interference amount estimated by the interference estimation unit to the first wireless station, and the first wireless station may determine at least one of a modulation scheme, a coding rate, or wireless stations with which transmission and reception are performed simultaneously through spatial multiplexing, and a frequency channel to be used, based on the interference amount.

In the wireless communication system described above, the plurality of second wireless stations each may include: a plurality of antenna elements; and reception power measurement units corresponding to the plurality of antenna elements.

Furthermore, the present invention is a wireless communication method in which wireless communication is performed between a first wireless station including a plurality of antenna elements, transmission units corresponding to the plurality of antenna elements, and a transmission directivity control unit that controls transmission directivity of the plurality of antenna element, and a plurality of second wireless stations each including a reception power measurement unit that measures a reception power, and the method includes: a step of determining, using the transmission directivity control unit in the first wireless station, the transmission directivity of each of the plurality of antenna elements so that a signal does not reach a particular second wireless station among the plurality of second wireless stations; a step of generating, using the transmission units in the first wireless station, wireless signals using the determined transmission directivity, and transmitting the generated wireless signals from the plurality of antenna elements; and a step of measuring, using the reception power measurement unit in the particular second wireless station, the reception power in a period that is set so that a signal does not reach the particular second wireless station, and detecting the presence or absence of interference.

Furthermore, the present invention is a wireless communication system in which a base station performs simultaneous communication of data with a plurality of terminals using the same frequency, and the base station includes: a data selection/generation unit that generates the data; a null signal terminal determination unit that determines, when there is a terminal for which an interference power needs to be evaluated, the terminal as a null signal terminal; a first reception unit that receives a signal transmitted from the null signal terminal and acquire interference power information; a transmission method determination unit that determines a transmission weight, a modulation scheme, and a coding scheme based on channel information of a terminal that is a communication party and the interference power information acquired from the null signal terminal; a data selection/output unit that selects transmission data destined for the terminal that is the communication party from among data to be transmitted and outputs the transmission data; and a first transmission unit that transmits the transmission data using the determined modulation scheme, coding scheme, and transmission weight, and each of the terminals including: a second reception unit that receives the transmission data as a reception signal; a reception signal demodulation unit that performs detection, synchronization, and decoding of the reception signal; a null signal determination unit that determines that each of the terminals itself is the null signal terminal based on an output of the reception signal demodulation unit; an interference power evaluation unit that measures a reception power of a null signal portion and records the reception power as an interference power when each of the terminals itself is determined to be the null signal terminal; and a second transmission unit that modulates, codes, and transmits information on the interference power.

Furthermore, in the wireless communication system described above, the null signal terminal determination unit in the base station may determine, as the null signal terminal, a terminal communicating with another base station adjacent to the base station, and the second transmission unit in each of the terminals may modulate and code the information on the interference power and may transmit resultant information to the base station communicating with each of the terminals.

Furthermore, in the wireless communication system described above, the null signal determination unit may determine that each of the terminals itself is the null signal terminal when a reception signal power of a data portion is smaller than a reception power of a pilot portion by an amount that is greater than or equal to a predetermined reference.

Furthermore, in the wireless communication system described above, the base station may include: a null signal ID notification unit that assigns a bit for specifying the null signal terminal as a null signal ID to a pilot signal in advance, and notifies a terminal as a candidate for the null signal terminal of the corresponding null signal ID; a downlink transmission unit that specifies the null signal ID when the pilot signal is added to the transmission data; and a null signal determination unit that determines that each of the terminals itself is the null signal terminal based on the null signal ID specified by the pilot signal of the reception signal.

Furthermore, in the wireless communication system described above, the null signal terminal determination unit may specify another base station as the null signal terminal.

Furthermore, in the wireless communication system described above, the null signal terminal determination unit may specify, as the null signal terminal, a terminal that has not been selected as the null signal terminal for a given period, a terminal that has not performed multiplexing communication with a plurality of terminals using the same frequency for a given period, or a terminal that has not been able to successfully perform communication when performing multiplexing communication with a plurality of terminals using the same frequency.

Furthermore, in the wireless communication system described above, the interference power evaluation unit may measure the reception power of the null signal portion at two or more timings, and record information on an increase amount of the interference power, and the second transmission unit may modulate, code, and transmit information on the interference power and the information on the increase amount of the interference power or information on an interference power obtained by applying a function to the interference power and the increase amount of the interference power.

Furthermore, in the wireless communication system described above, the data selection/output unit may calculate a duration in which the interference power does not exceed a predetermined maximum interference power based on the information on the interference power and the information on the increase amount of the interference power estimated for a terminal, and may determine the maximum data length that is able to be set for the terminal.

In multi-user MIMO beamforming, channel information between terminals and a base station is estimated, transmission weights are calculated so that inter-user interference does not occur between terminals to which simultaneous transmission from the base station is performed, signal processing is performed, and then a transmission process is performed. However, despite inter-user interference occurs because there is an error in the estimated channel information, a modulation scheme, a coding rate, and a multiplexing order are selected without taking this fact into consideration, and thus there is a problem in that communication quality is deteriorated.

In the present invention, when transmission from a base station is performed, a null signal terminal which is the target of measurement of inter-user interference is set, and transmission is performed with transmission weights applied so that a null is directed to the null signal terminal. On the other hand, if the null signal terminal receives a signal despite the null being directed to the null signal terminal, the null signal terminal notifies the base station of a reception power as the interference. The base station receiving the notification calculates the optimal modulation scheme, the optimal coding rate, and the optimal multiplexing rate based on the notified interference power, and performs communication with the null signal terminal.

As a result, it is possible to select the optimal modulation scheme, the optimal coding rate, and the optimal multiplexing order in consideration of the channel estimation error in multi-user MIMO.

Furthermore, the present invention may be applied to a case in which there is a plurality of base stations (communication cells). In this case, a first base station performs transmission to a terminal that is connected to a second base station and serves as the null signal terminal, and the terminal notifies the second base station of the interference.

Advantageous Effects of Invention

As described above, in accordance with the present invention, even if there is interference due to low accuracy of channel information, a null is directed to a terminal, interference in the terminal is detected, and channel estimation is performed again to re-acquire channel information when the terminal is determined to suffer from the interference, thereby improving the accuracy of the channel information and mitigating the interference.

Moreover, even if there is interference due to low accuracy of channel information, interference due to another base station or another wireless communication system, or the like, the interference amount is measured and communication with increasing interference resistance in accordance with the interference amount is performed, thereby mitigating the influence of the interference.

Furthermore, when transmissions to a plurality of communication parties are performed at the same time using the same frequency through a spatial multiplexing scheme, it is possible to evaluate the inter-user interference and appropriately select a modulation scheme, a coding rate, and the number of spatial streams for each terminal.

BRIEF DESCRIPTION OF DRAWINGS

FIG. 23 is a conceptual diagram illustrating a relationship between a transmission rate, a modulation scheme, and a coding rate.

MODES FOR CARRYING OUT THE INVENTION

Hereinafter, embodiments of the present invention will be described with reference to the drawings.

In first to eighth embodiments of the present invention, a base station performs a notification of a period in which a null is directed to another wireless station using any means, and the other wireless station measures a reception power in the period and detects the presence or absence of interference based on the reception power (the first embodiment). In the case of autonomous distributed access control such as a wireless LAN, it is preferable to perform the notification of the period in which the null is directed to the other wireless station in each communication; in contrast, in the case of access control in which a channel is allocated in a fixed manner, it is not necessary to perform the notification each time, if the notification of the period in which the null is directed and the allocation of a channel are performed.

As a method for determining a wireless station to which a null is to be directed, there is periodic selection (the first embodiment), selection of a wireless station having a high error rate (the fourth and fifth embodiments), selection of a wireless station for which there is no data (the second embodiment), or the like; moreover, there is exclusion of a terminal having low accuracy of channel information from a MU-MIMO transmission group (the third embodiment) or the like. A determination of the modulation scheme (the fourth embodiment) and the frequency (the sixth embodiment) at the base station, based on a reception power in a period in which the wireless station is a transmission destination and a reception power in a period in which a null is directed to the wireless station, falls within the scope of the present invention.

A. First Embodiment

Figure 1:
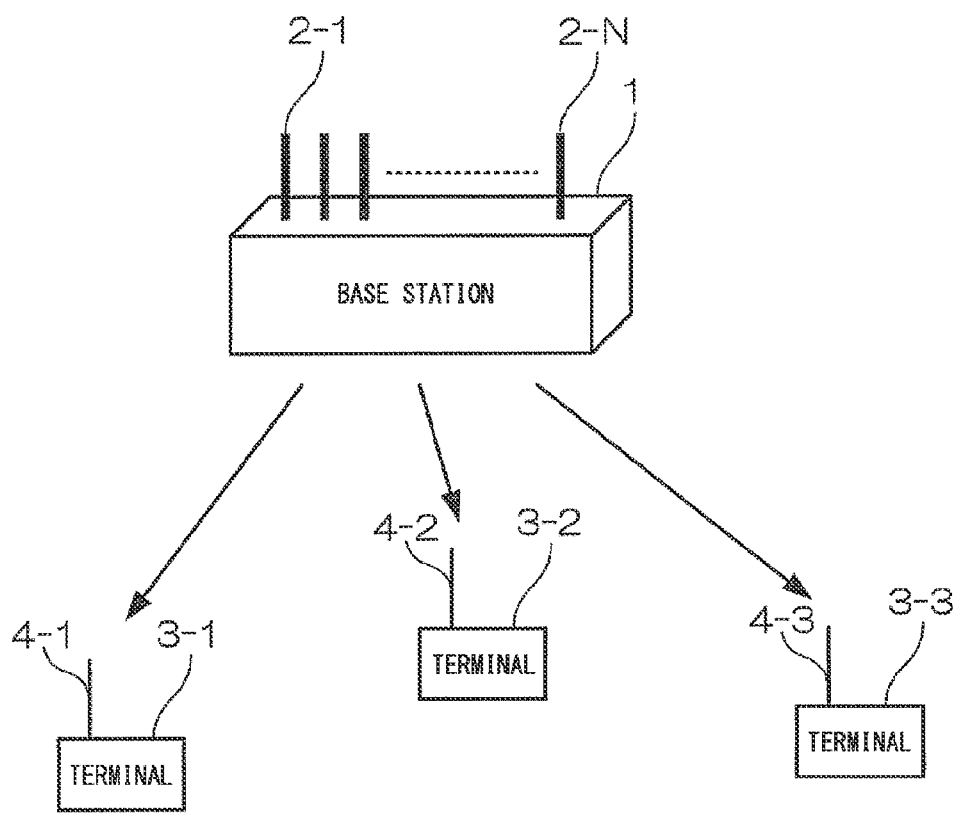
FIG. 1 is a block diagram illustrating a configuration of a wireless communication system in accordance with a first embodiment of the present invention.

FIG. 1 is a block diagram illustrating a configuration of a wireless communication system in accordance with a first embodiment of the present invention. The wireless communication system includes one base station 1 and three terminals 3-1 to 3-3. The base station 1 has N (N≥3) antennas 2-1 to 2-N, and the terminals 3-1 to 3-3 have antennas 4-1 to 4-3, respectively. An OFDM (orthogonal frequency division multiplexing) scheme is used as a communication scheme. The base station 1 and the terminals 3-1 to 3-3 each acquire a transmission right through CSMA/CA (carrier sense multiple access with collision avoidance) access control and transmit a packet. After acquiring the transmission right, the packet is transmitted using MU-MIMO from the base station 1 to the terminals 3-1 to 3-3. The terminals 3-1 to 3-3 have unique identifiers.

Figure 2:
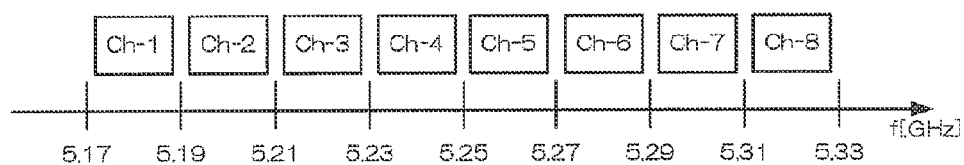
FIG. 2 is a conceptual diagram illustrating a channel configuration of the wireless communication system in accordance with the present first embodiment.
Figure 3:
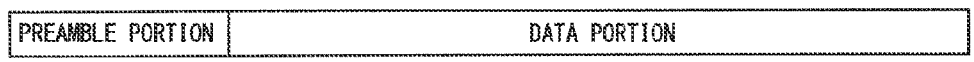
FIG. 3 is a conceptual diagram illustrating a configuration of a packet transmitted and received in the wireless communication system in accordance with the present first embodiment.

FIG. 2 is a conceptual diagram illustrating a channel configuration of the wireless communication system in accordance with the present first embodiment. Moreover, FIG. 3 is a conceptual diagram illustrating a configuration of a packet that is transmitted and received in the wireless communication system in accordance with the present first embodiment. As shown in FIG. 2, in the wireless communication system, 8 channels of 5.17 to 5.33 GHz with a bandwidth of 20 MHz per channel are assumed to be available. In a physical layer, a packet to be transmitted and received includes a preamble portion and a data portion, as shown in FIG. 3.

Figure 4:
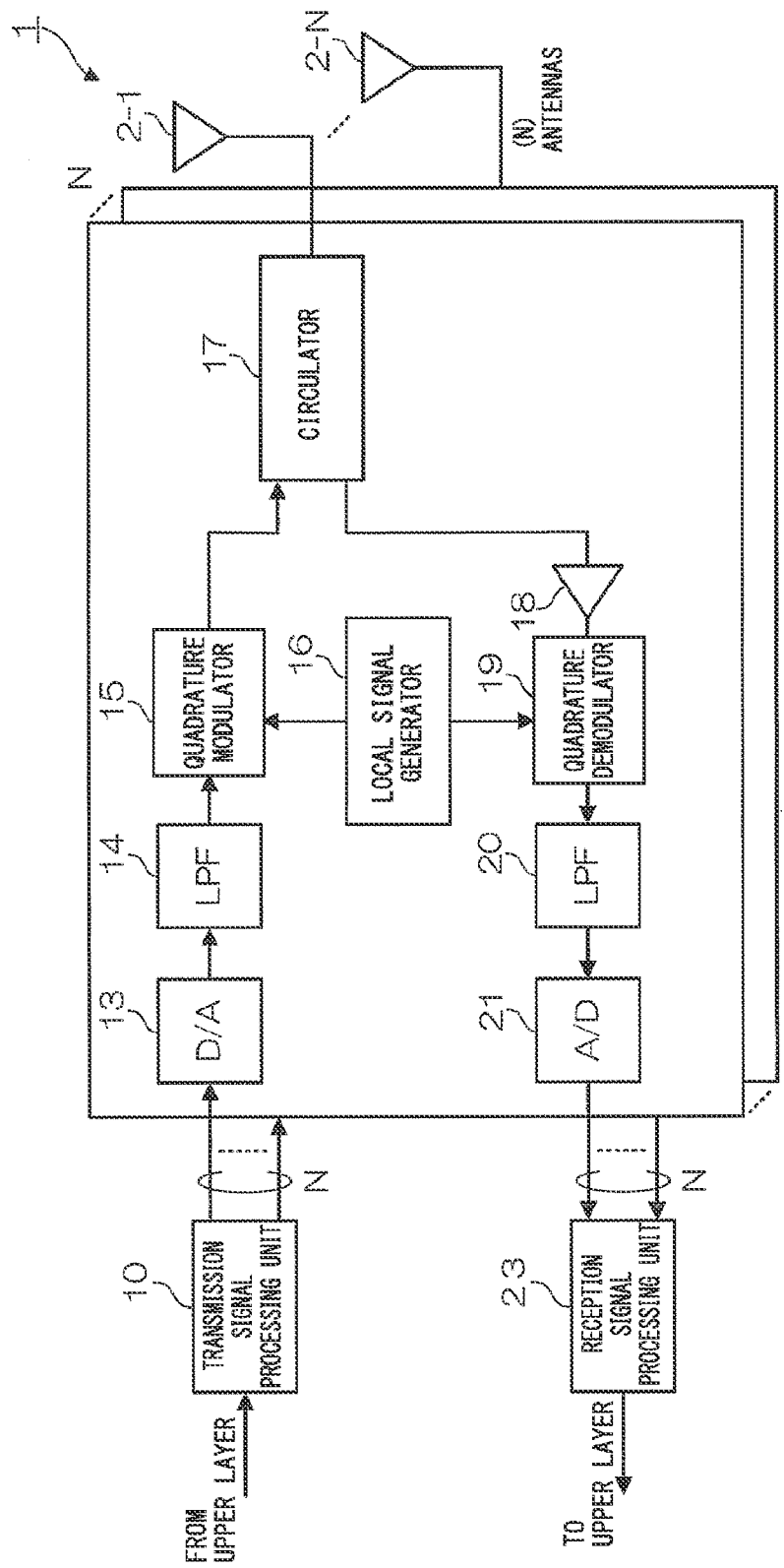
FIG. 4 is a block diagram illustrating a configuration of a base station of the wireless communication system in accordance with the present first embodiment.

FIG. 4 is a block diagram illustrating a configuration of the base station in the wireless communication system in accordance with the present first embodiment. The base station 1 includes a transmission signal processing unit 10, a digital/analog signal converter (D/A) 13, a low pass filter (LPF) 14, a quadrature modulator 15, a local signal generator 16, a circulator 17, a low noise amplifier (LNA) 18, a quadrature demodulator 19, a low pass filter (LPF) 20, an analog/digital signal converter (A/D) 21, a reception signal processing unit 23, and antennas 2-1 to 2-N.

Details of the transmission signal processing unit 10 and the reception signal processing unit 23 will be described below. The digital/analog signal converter 13 converts a digital signal into an analog signal. The low pass filter 14 passes signal components in a predetermined frequency band from DC. The quadrature modulator 15 mixes an input baseband IQ signal with a local signal to convert the signal to a high frequency wireless signal. The local signal generator 16 generates a high frequency local signal.

The circulator 17 outputs the signal output from the quadrature modulator 15 to one of the antennas 2-1 to 2-N and outputs a signal output from one of the antennas 2-1 to 2-N to the low noise amplifier 18. The low noise amplifier 18 amplifies a reception signal. The quadrature demodulator 19 mixes the input high frequency wireless signal with the local signal to convert the signal into a baseband IQ signal. The low pass filter 20 passes signal components in a predetermined frequency band from DC. The analog/digital signal converter 21 converts an analog signal into a digital signal. The antennas 2-1 to 2-N perform transmission and reception of the high frequency wireless signal.

Figure 5:
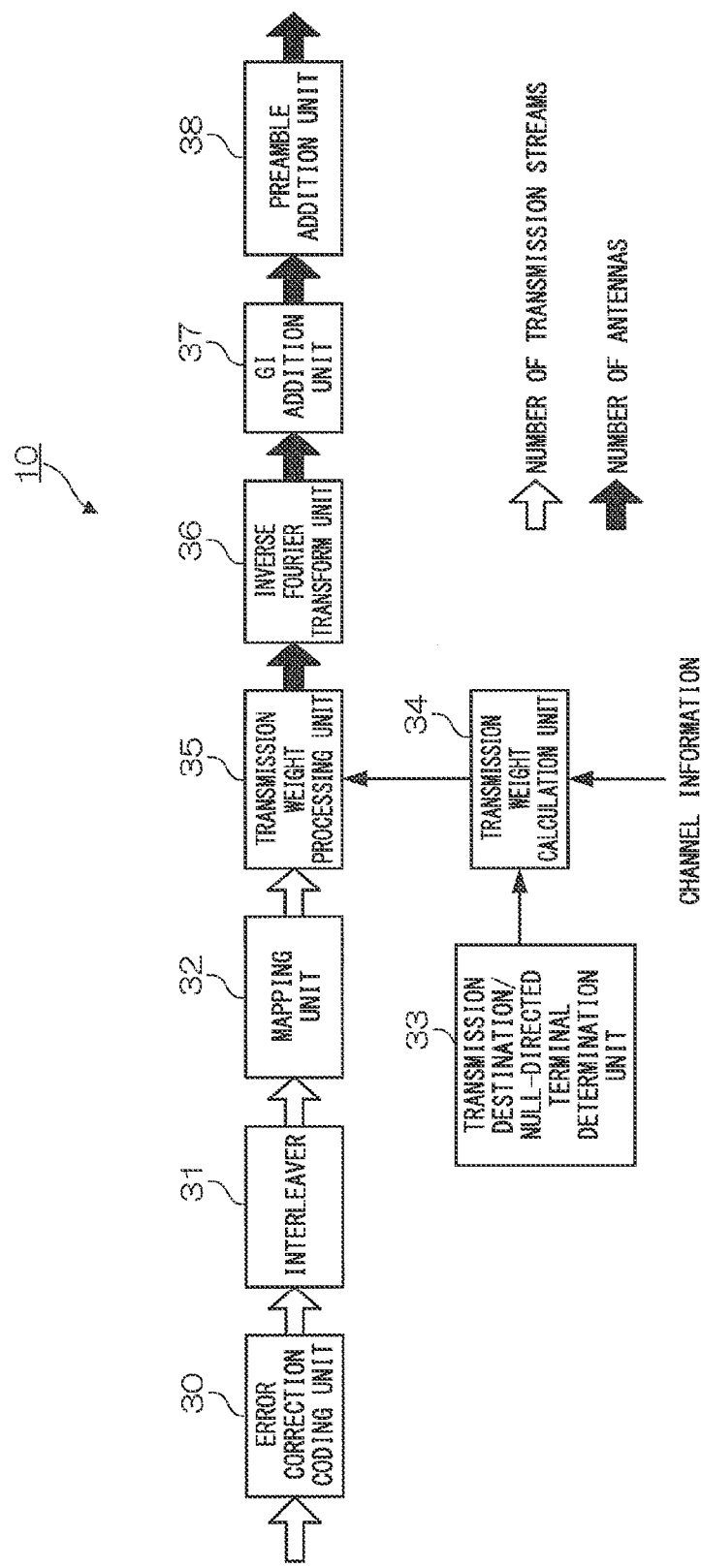
FIG. 5 is a block diagram illustrating a configuration of a transmission signal processing unit 10 of a base station 1 in accordance with the present first embodiment.

FIG. 5 is a block diagram illustrating a configuration of the transmission signal processing unit 10 in the base station 1 in accordance with the present first embodiment. The transmission signal processing unit 10 includes an error correction coding unit 30, an interleaver 31, a mapping unit 32, a transmission destination/null-directed terminal determination unit 33, a transmission weight calculation unit 34, a transmission weight processing unit 35, an inverse Fourier transform unit 36, a GI addition unit 37, and a preamble addition unit 38.

The error correction coding unit 30 performs error correction coding on a binary signal delivered from an upper layer. The interleaver 31 rearranges the binary signal that has been subjected to the error correction coding in accordance with a predetermined pattern. The mapping unit 32 converts the binary signal into a baseband IQ signal. The transmission destination/null-directed terminal determination unit 33 determines a terminal to which application data is to be transmitted using MU-MIMO and a terminal to which a null is to be directed.

The transmission weight calculation unit 34 calculates weights for forming transmission beams from channel information. The transmission weight processing unit 35 multiplies the baseband IQ signal by the weights for forming the transmission beams for subcarriers. The inverse Fourier transform unit 36 performs an inverse Fourier transform process. The GI addition unit 37 adds a GI (guard interval) for each OFDM symbol. The preamble addition unit 38 adds a preamble.

Figure 6:
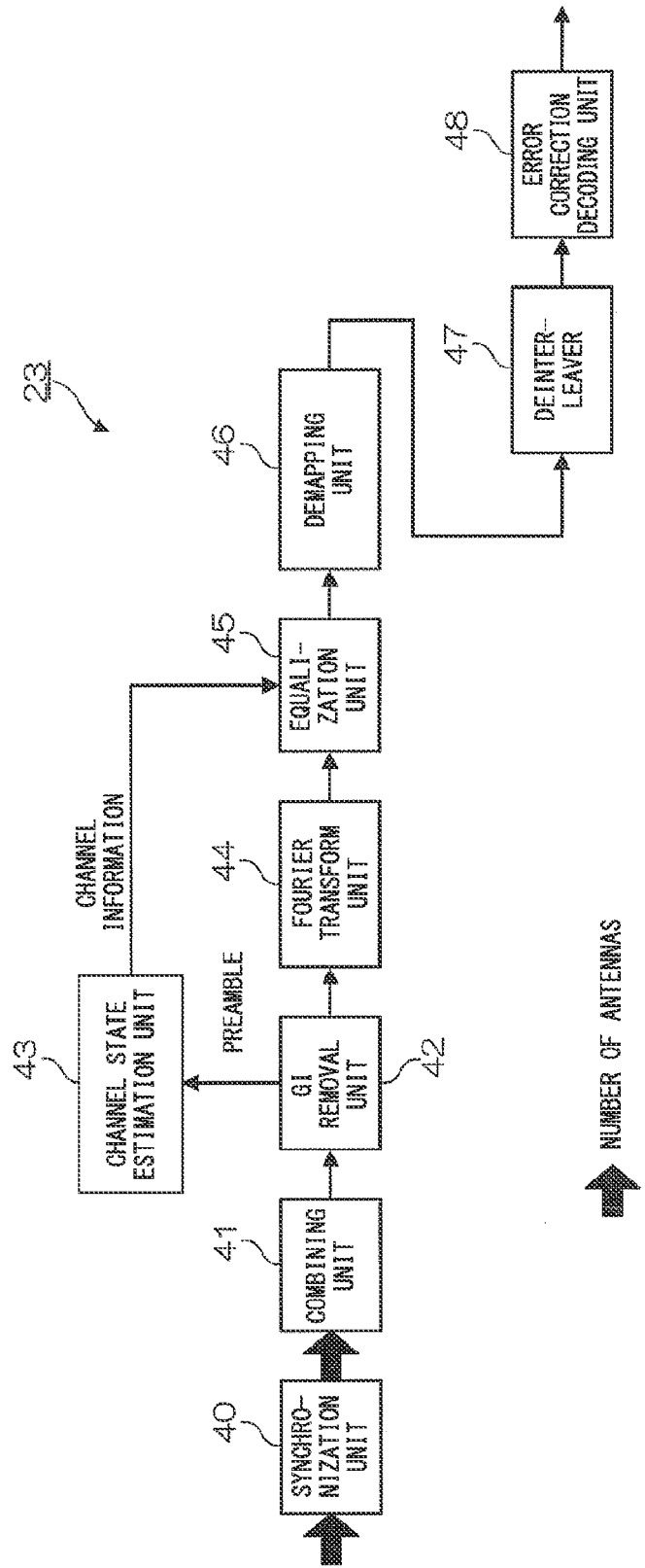
FIG. 6 is a block diagram illustrating a configuration of a reception signal processing unit 23 of the base station 1 in accordance with the present first embodiment.

FIG. 6 is a block diagram illustrating a configuration of the reception signal processing unit 23 in the base station 1 in accordance with the present first embodiment. The reception signal processing unit 23 includes a synchronization unit 40, a combining unit 41, a GI removal unit 42, a channel state estimation unit 43, a Fourier transform unit 44, an equalization unit 45, a demapping unit 46, a deinterleaver 47, and an error correction decoding unit 48.

The synchronization unit 40 performs timing synchronization, frequency offset compensation, or the like. The combining unit 41 combines signals received by the antennas. The GI removal unit 42 removes a GI. The channel state estimation unit 43 estimates a channel state of each subcarrier from a preamble of a reception signal. The Fourier transform unit 44 performs a Fourier transform. The equalization unit 45 performs equalization based on the estimated channel state.

The demapping unit 46 converts a baseband IQ signal into a binary signal. The deinterleaver 47 restores the arrangement of the binary signal to an original one using a predetermined pattern. The error correction decoding unit 48 performs error correction and restores an original binary signal before error correction coding.

Figure 7:
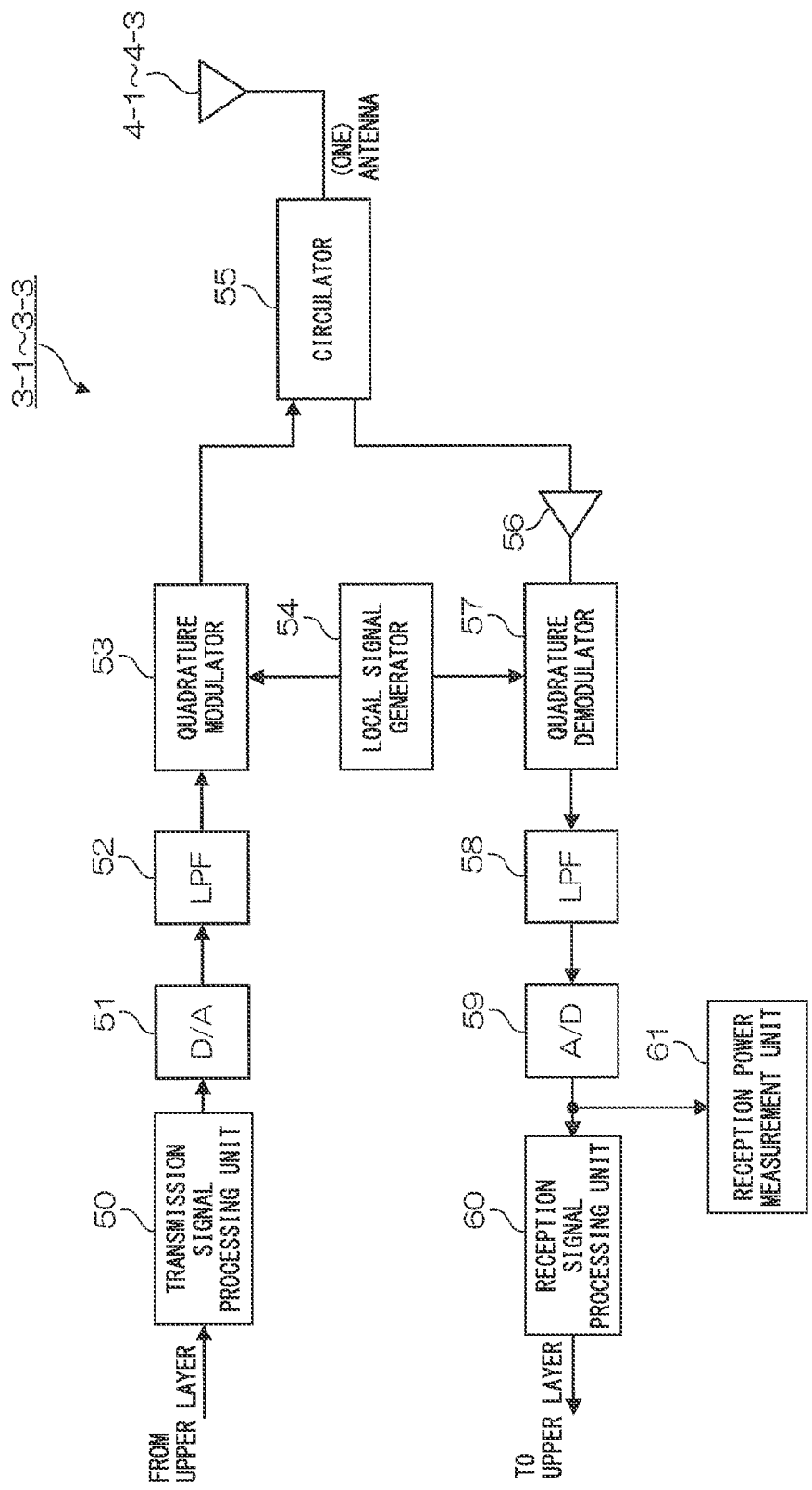
FIG. 7 is a block diagram illustrating a configuration of terminals 3-1 to 3-3 of the wireless communication system in accordance with the present first embodiment.

FIG. 7 is a block diagram illustrating a configuration of the terminals 3-1 to 3-3 in the wireless communication system in accordance with the present first embodiment. The terminals 3-1 to 3-3 each include a transmission signal processing unit 50, a digital/analog signal converter (D/A) 51, a low pass filter (LPF) 52, a quadrature modulator 53, a local signal generator 54, a circulator 55, a low noise amplifier (LNA) 56, a quadrature demodulator 57, a low pass filter (LPF) 58, an analog/digital signal converter (A/D) 59, a reception signal processing unit 60, a reception power measurement unit 61, and one of antennas 4-1 to 4-3 (corresponding to the terminals 3-1 to 3-3, respectively).

Details of the transmission signal processing unit 50 and the reception signal processing unit 60 will be described below. The digital/analog signal converter 51 converts a digital signal into an analog signal. The low pass filter 52 passes signal components in a predetermined frequency band from DC. The quadrature modulator 53 mixes an input baseband IQ signal with a local signal to convert the signal into a high frequency wireless signal. The local signal generator 54 generates a high frequency local signal.

The circulator 55 outputs the signal output from the quadrature modulator 53 to one of the antennas 4-1 to 4-3 and outputs a signal output from one of the antennas 4-1 to 4-3 to the low noise amplifier 56. The low noise amplifier 56 amplifies a reception signal. The quadrature demodulator 57 mixes an input high frequency wireless signal with the local signal to convert the signal into a baseband IQ signal. The low pass filter 58 passes signal components in a predetermined frequency band from DC. The analog/digital signal converter 59 converts an analog signal into a digital signal. The antennas 4-1 to 4-3 perform transmission and reception of the high frequency wireless signal.

The difference with the configuration of the base station 1 is the presence of the reception power measurement unit 61. The reception power measurement unit 61 measures the power of the reception signal.

Figure 8:
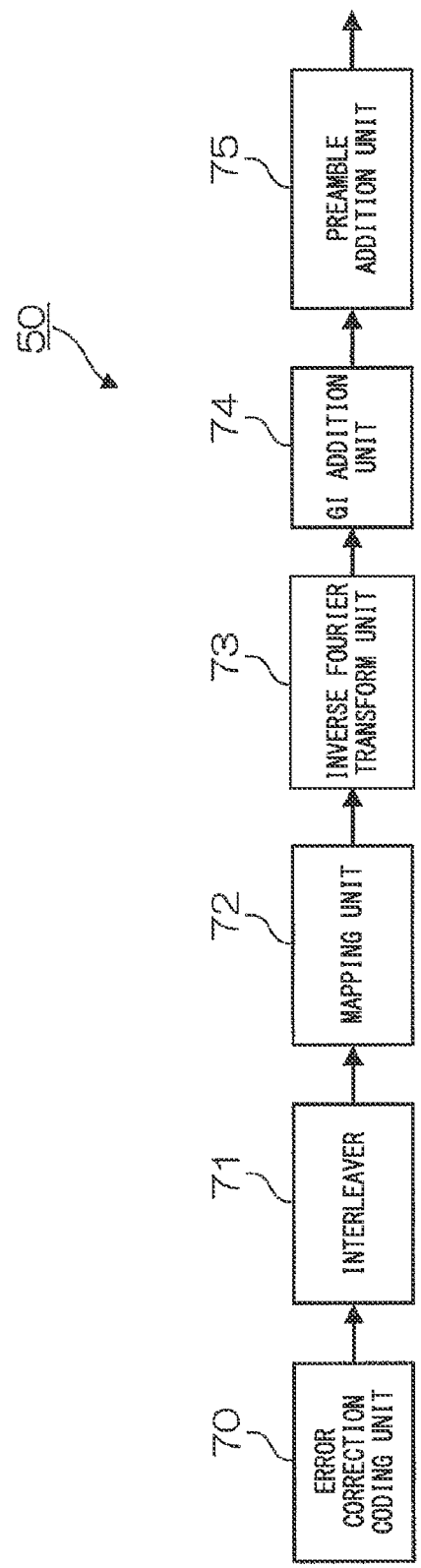
FIG. 8 is a block diagram illustrating a configuration of a transmission signal processing unit 50 of the terminals 3-1 to 3-3 in accordance with the present first embodiment.

FIG. 8 is a block diagram illustrating a configuration of the transmission signal processing unit 50 in the terminals 3-1 to 3-3 in accordance with the present first embodiment. The transmission signal processing unit 50 includes an error correction coding unit 70, an interleaver 71, a mapping unit 72, an inverse Fourier transform unit 73, a GI addition unit 74, and a preamble addition unit 75.

The error correction coding unit 70 performs error correction coding on a binary signal delivered from an upper layer. The interleaver 71 rearranges the binary signal that has been subjected to the error correction coding in accordance with a predetermined pattern. The mapping unit 72 converts the binary signal into a baseband IQ signal. The inverse Fourier transform unit 73 performs an inverse Fourier transform process. The GI addition unit 74 adds a GI (guard interval) for each OFDM symbol. The preamble addition unit 75 adds a preamble.

The difference with the transmission signal processing unit 10 in the base station 1 is that the transmission destination/null-directed terminal determination unit 33, the transmission weight processing unit 35, and the transmission weight calculation unit 34 are not included.

Figure 9:
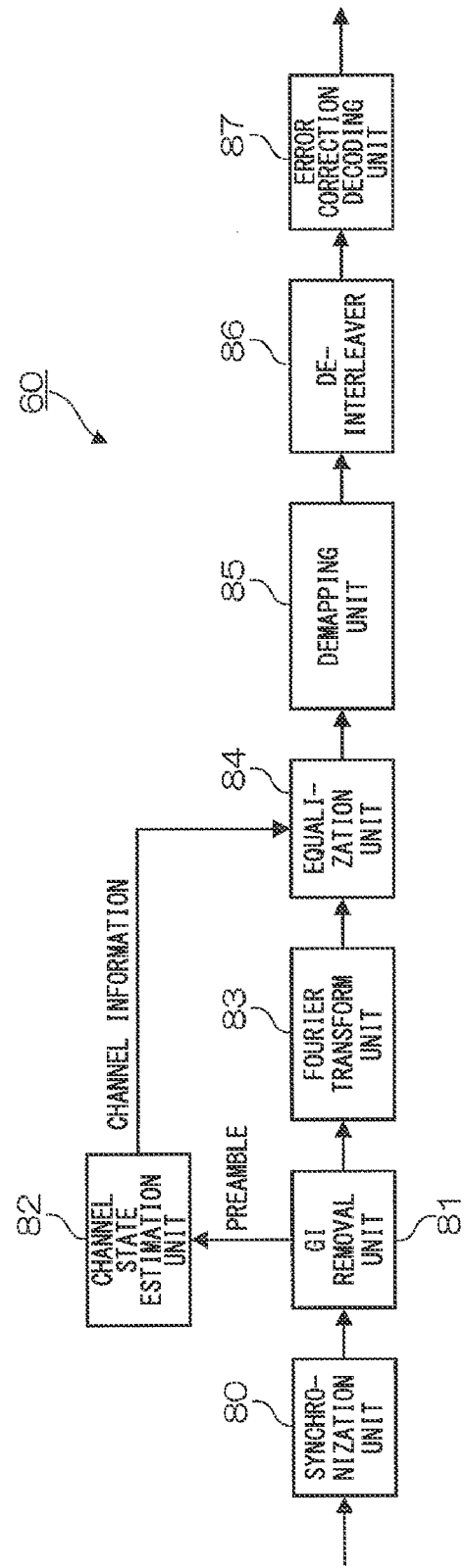
FIG. 9 is a block diagram illustrating a configuration of a reception signal processing unit 60 of the terminals 3-1 to 3-3 in accordance with the present first embodiment.

FIG. 9 is a block diagram illustrating a configuration of the reception signal processing unit 60 of the terminals 3-1 to 3-3 in accordance with the present first embodiment. The reception signal processing unit 60 includes a synchronization unit 80, a GI removal unit 81, a channel state estimation unit 82, a Fourier transform unit 83, an equalization unit 84, a demapping unit 85, a deinterleaver 86, and an error correction decoding unit 87.

The synchronization unit 80 performs timing synchronization, frequency offset compensation, or the like. The GI removal unit 81 removes a GI. The channel state estimation unit 82 estimates a channel state of each subcarrier from a preamble of a reception signal. The Fourier transform unit 83 performs a Fourier transform. The equalization unit 84 performs equalization based on the estimated channel state.

The demapping unit 85 converts a baseband IQ signal into a binary signal. The deinterleaver 86 restores the arrangement of the binary signal in accordance with a predetermined pattern. The error correction decoding unit 87 performs error correction and restores an original binary signal before error correction coding. That is, the reception signal processing unit 60 of the terminals 3-1 to 3-3 has a configuration obtained by removing the combining unit 41 from the configuration of the reception signal processing unit 23 of the base station 1.

Figure 10:
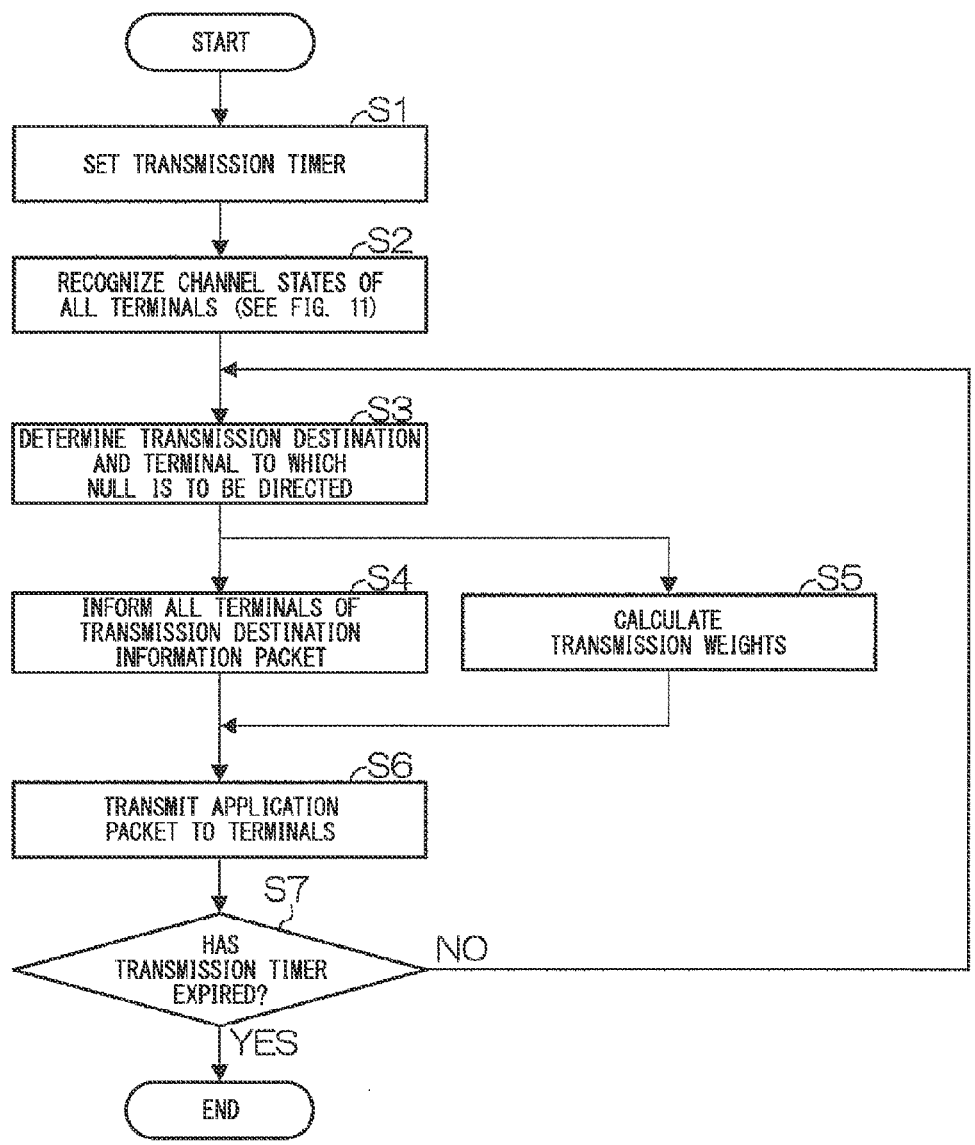
FIG. 10 is a flowchart describing an operation of the base station 1 of the wireless communication system in accordance with the present first embodiment.
Figure 11:
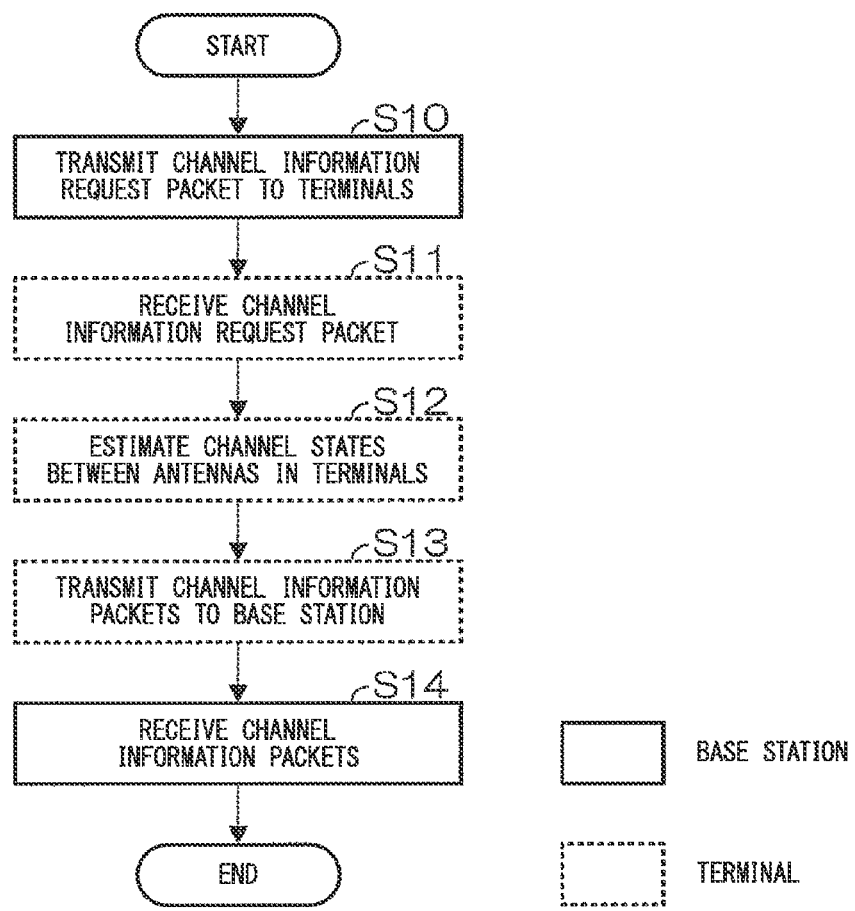
FIG. 11 is a flowchart describing a process in which the base station 1 recognizes channel states of all the terminals 3-1 to 3-3 in accordance with the present first embodiment.

FIG. 10 is a flowchart describing an operation of the base station 1 of the wireless communication system in accordance with the present first embodiment. First, the base station 1 sets a transmission timer (step S1). The base station 1 then recognizes channel states of all the terminals 3-1 to 3-3 (step S2). Details of this process will be described below (FIG. 11). After recognizing the channel states of the terminals 3-1 to 3-3, the base station 1 determines a terminal to which application data is to be transmitted and a terminal to which a null is to be directed (step S3).

Then, the base station 1 informs all the terminals 3-1 to 3-3 of a transmission destination information packet (step S4). This packet stores information on an identifier of "a terminal to which an application packet is to be transmitted" and an identifier of "a terminal to which a null is to be directed", the number of a channel used for transmission and reception of the application packet, and information on a time when the application packet is to be transmitted. Furthermore, at the same time, the base station 1 calculates transmission weights based on the channel states acquired from the terminals 3-1 to 3-3 (step S5). The base station 1 then transmits the application packet to the terminals 3-1 to 3-3, and the terminals 3-1 to 3-3 receive the packet (step S6).

Next, the base station 1 determines whether or not the transmission timer has expired (step S7), and returns the process to step S3 to repeat the determination of a terminal to which application data is to be transmitted and a terminal to which a null is to be directed, as well as the transmission of the application packet, until the transmission timer expires. It is to be noted that if an interference information packet is received from any one of the terminals 3-1 to 3-3, the base station 1 immediately performs a process of step S2 (FIG. 11) to acquire a channel information packet, updates the channel states, and recalculates transmission weights using information on the channel states. In contrast, if the transmission timer has expired, the base station 1 ends the process.

FIG. 11 is a flowchart describing a process in which the base station 1 recognizes the channel states of all the terminals 3-1 to 3-3 in step S2 described above. Solid lines indicate processes of the base station 1 and dotted lines indicate processes of the terminals 3-1 to 3-3. First, the base station 1 transmits a channel information request packet to all the terminals 3-1 to 3-3 (step S10). The terminals 3-1 to 3-3 receive the channel information request packet (step S11) and estimate channel states between the antennas of the base station 1 and the antennas of the terminals 3-1 to 3-3 (step S12). The terminals 3-1 to 3-3 transmit the estimated channel states as channel information packets to the base station 1 (step S13). The base station 1 receives the channel information packets and recognizes the channel states (step S 14).

Figure 12:
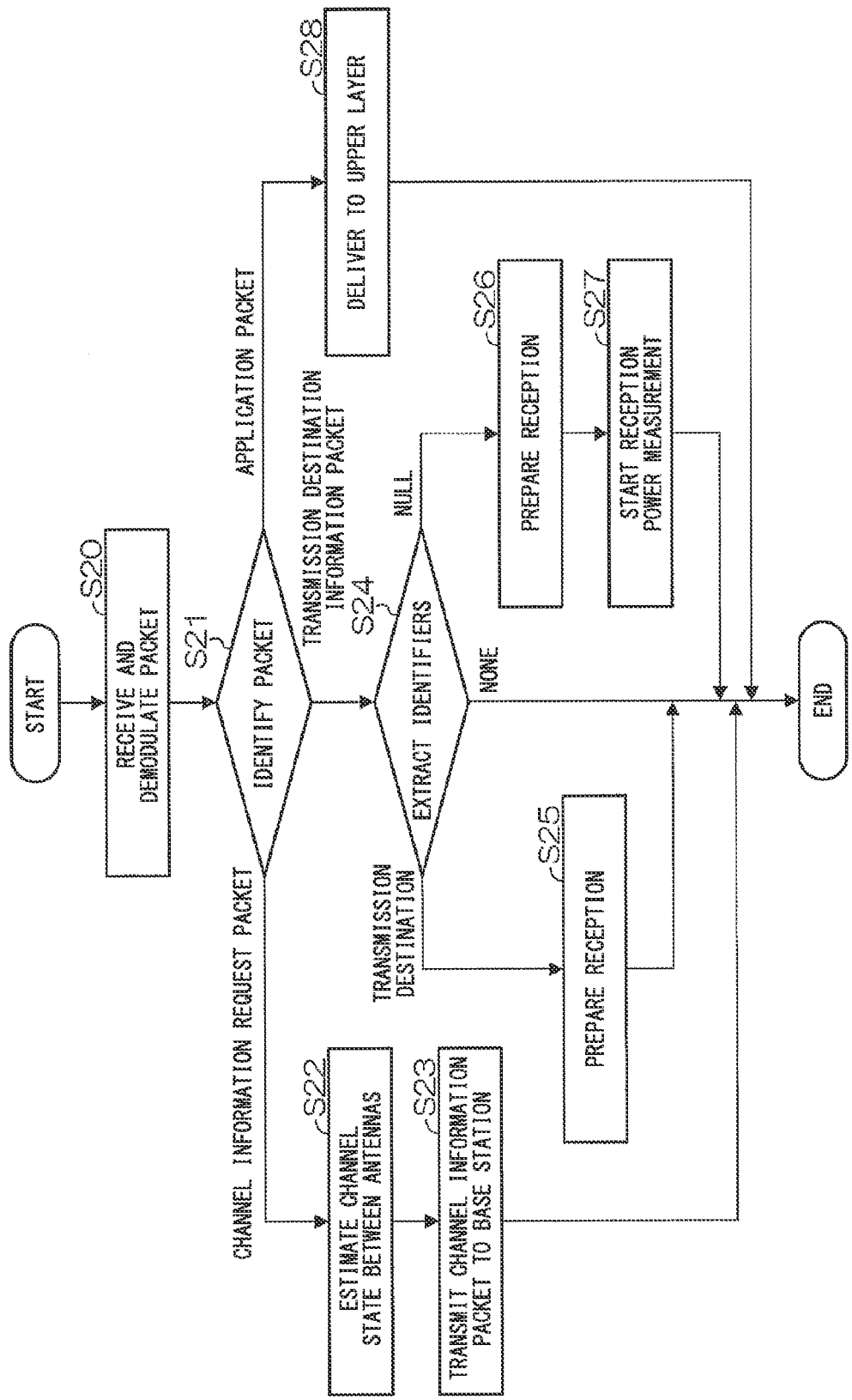
FIG. 12 is a flowchart describing an operation of the terminals 3-1 to 3-3 of the wireless communication system in accordance with the present first embodiment.

FIG. 12 is a flowchart describing an operation of the terminals 3-1 to 3-3 of the wireless communication system in accordance with the present first embodiment. First, the terminals 3-1 to 3-3 each decode a packet destined for the station itself (step S20) and then identify the packet (step S21). If the packet is a channel information request packet, the terminals 3-1 to 3-3 estimate channel states (step S22), store the estimated channel states in channel information packets, and transmit the channel information packets to the base station 1 (step S23).

In contrast, if the packet is a transmission destination information packet in step S21, the terminals 3-1 to 3-3 each extract stored terminal identifiers (step S24). Then, if the identifier of the station itself is included therein as an identifier of "a terminal to which an application packet is to be transmitted" or an identifier of "a terminal to which a null is to be directed", the terminals 3-1 to 3-3 each perform reception preparation so that a specified channel number can be used (steps S25 and S26). An example of the reception preparation includes a process of changing the frequency of a local signal and the pass band of the LPF in accordance with the channel number used for transmission and reception of the application packet. Moreover, when the identifier of the station itself is included as an identifier of "a terminal to which a null is to be directed", the terminals 3-1 to 3-3 each start reception power measurement (step S27).

In contrast, if the packet is an application packet in step S21, the terminals 3-1 to 3-3 each perform a demodulation process on the packet and deliver the packet to a processing unit of an upper layer (step S28).

Figure 13:
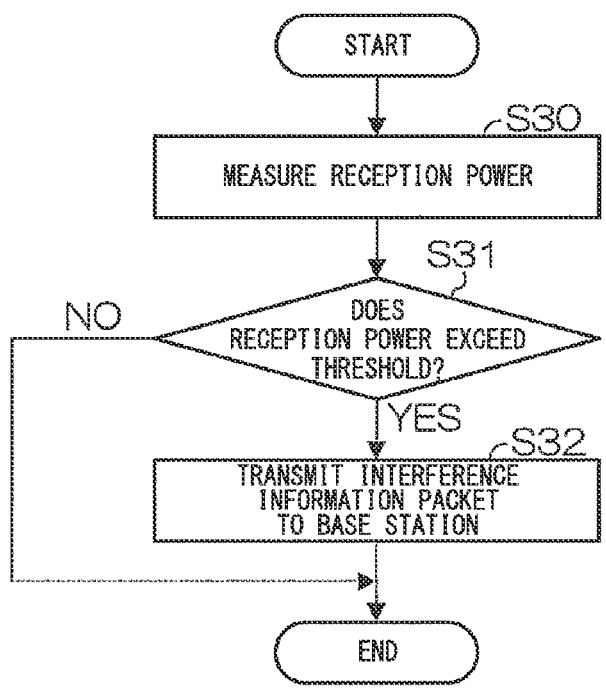
FIG. 13 is a flowchart describing a reception power measurement process of the terminals 3-1 to 3-3 to which a null is directed in the present first embodiment.

FIG. 13 is a flowchart describing a reception power measurement process of the terminals 3-1 to 3-3 to which the null is directed (step S27 in FIG. 12) in the present first embodiment. First, the terminals 3-1 to 3-3 each measures a reception power (step S30) and determine whether or not the reception power exceeds a threshold (step S31); if the reception power exceeds the threshold, the terminals 3-1 to 3-3 each store the reception power in an interference information packet and transmit the interference information packet to the base station 1 (step S32). If the reception power does not exceed the threshold, the terminals 3-1 to 3-3 each end the process without doing anything. If the base station 1 receives the interference information packet from one of the terminals 3-1 to 3-3, the base station 1 recognizes the channel states of the terminals 3-1 to 3-3 through the process shown in FIG. 11.

Next, a specific process example will be described. As shown in FIG. 1, there is one base station 1 and three terminals 3-1 to 3-3, and the terminals 3-1 to 3-3 belong to the base station 1. The base station 1 and the terminals 3-1 to 3-3 perform transmission and reception of a control packet (e.g., a beacon) using a channel Ch-4. In this case, it is assumed that the terminals 3-1 to 3-3 connect to the Internet via the base station 1 and start application communication. Access of the base station 1 and the terminals 3-1 to 3-3 is controlled in accordance with CSMA/CA (carrier sense multiple access with collision avoidance), but an application packet is immediately transmitted from the base station 1 to the terminals 3-1 to 3-3 immediately after a transmission destination information packet is transmitted from the base station 1 to the terminals 3-1 to 3-3.

Figure 14:
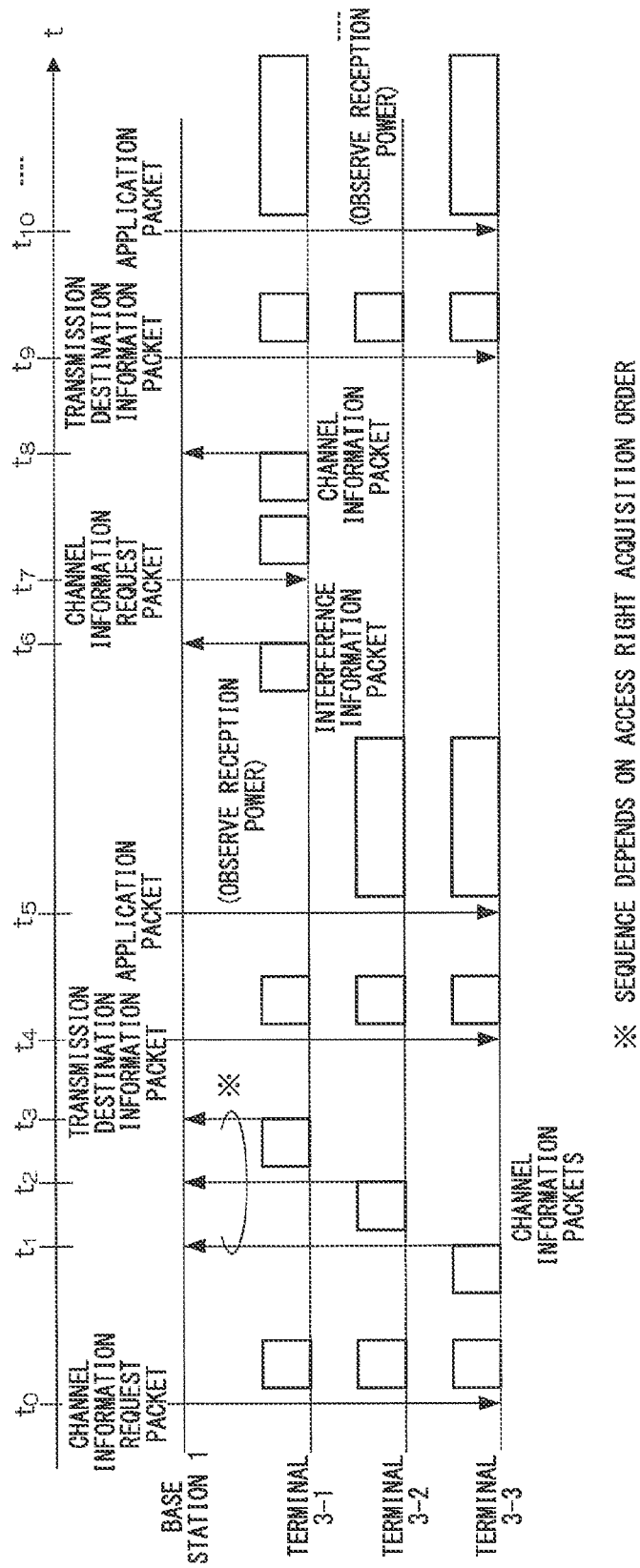
FIG. 14 is a timing chart illustrating a packet control flow of the wireless communication system in accordance with the present first embodiment.

FIG. 14 is a timing chart illustrating a packet control flow of the wireless communication system in accordance with the present first embodiment. First, the base station 1 transmits a channel information request packet to all the terminals 3-1 to 3-3 ($t_0$). The base station 1 generates the packet in an upper layer and then generates a baseband signal through the error correction coding 30, the interleaver 31, the mapping unit 32, the transmission weight processing unit 35, the inverse Fourier transform unit 36, the GI addition unit 37, and the preamble addition unit 38 in the transmission signal processing unit 10. In this case, the transmission weight processing unit 35 sets the weights so that signals are received by all the terminals 3-1 to 3-3.

It is to be noted that the preamble of this packet is configured so that the channel states between the transmission antennas 2-1 to 2-N of the base station 1 and the reception antennas 4-1 to 4-3 of the terminals 3-1 to 3-3 can be estimated using code division multiplexing or the like. The quadrature modulator 15 mixes a baseband signal with a local signal at 5.24 GHz to convert the signal into a high frequency wireless signal, which is then output from the antennas 2-1 to 2-N.

All the terminals 3-1 to 3-3 each receive the packet using their antennas 4-1 to 4-3, mix the packet with a local signal at 5.24 GHz to convert the packet into a baseband signal in the quadrature demodulator 57, decode the packet through the synchronization unit 80, the GI removal unit 81, the Fourier transform unit 83, the equalization unit 84, the demapping unit 85, the deinterleaver 86, and the error correction decoding unit 87 in the reception signal processing unit 60, and deliver the packet to the upper layer to recognize the packet. In this case, the terminals 3-1 to 3-3 estimate the channel states between the antennas 2-1 to 2-N of the base station 1 and the antennas 4-1 to 4-3 of the terminals 3-1 to 3-3 using the packet. The terminals 3-1 to 3-3 store the estimated channel states in channel information packets and transmit the channel information packets to the base station 1 ($t_1$ to $t_3$).

The base station 1 receives the channel information packets from all the terminals 3-1 to 3-3 through the antennas 2-1 to 2-N, performs decoding through the quadrature demodulator 19 or the like and the reception signal processing unit 23, and delivers the packets to an upper layer processing unit (not shown) to recognize the packets. The base station 1 extracts the channel information of the terminals 3-1 to 3-3 and delivers the channel information to the transmission weight calculation unit 34 in the transmission signal processing unit 10. The base station 1 then determines a terminal to which an application packet is to be transmitted and a terminal to which a null is to be directed.

Here, the base station 1 determines to direct the null to the terminal 3-1 and transmit the application packet to the terminal 3-2 and the terminal 3-3. After the determination, the base station 1 generates a transmission destination information packet. The base station 1 stores the identifiers of the terminals 3-2 and 3-3 as "terminals to which an application packet is to be transmitted" in the transmission destination information packet, stores the identifier of the terminal 3-1 as "a terminal to which a null is to be directed" in the transmission destination information packet, stores "4" as the number of a channel used for transmission and reception of an application packet in the transmission destination information packet, and transmits the transmission destination information packet to all the terminals 3-1 to 3-3 ($t_4$).

The terminals 3-1 to 3-3 each receive the transmission destination information packet; the terminal 3-1 recognizes as "a terminal to which a null is to be directed", and the terminal 3-2 and 3-3 recognize as "terminals to which an application packet is to be transmitted". The terminals 3-1 to 3-3 each set the frequency of the local signal and the pass band of the LPF 58 so that a signal transmitted via the channel of the channel number "4" can be received.

The base station 1 calculates a transmission weight for each subcarrier from the delivered channel information so that a null is directed to the terminal 3-1 and signals reach the terminals 3-2 and 3-3. After the calculation, the base station 1 transmits the application packet to the terminal 3-2 and the terminal 3-3 ($t_5$). The terminal 3-2 and the terminal 3-3 each receive the application packet, perform decoding, and deliver the application packet to the upper layer.

In contrast, the terminal 3-1 observes a reception power. The terminal 3-1 observes the reception power for a period in which the application packet is transmitted, and, if the reception power exceeds a threshold, determines that interference occurs and transmits an interference information packet to the base station 1 ($t_6$). If the base station 1 receives the interference information packet, the base station 1 sets the weights so that a signal is received by the terminal 3-1, and then transmits a channel information request packet to the terminal 3-1 ($t_7$).

After receiving the packet, the terminal 3-1 estimates the channel state between the antennas 2-1 to 2-N of the base station 1 and the antenna 4-1 of the terminal 3-1 again. The terminal 3-1 stores the estimated channel state in a channel information packet and transmits the channel information packet to the base station 1 ($t_8$). The base station 1 decodes the channel information packet and updates the channel information between the antennas of the base station 1 and the antenna of the terminal 3-1. The base station 1 then determines a terminal to which a null is to be directed again. Next, the base station 1 determines to direct a null to the terminal 3-2 and transmit an application packet to the terminal 3-1 and the terminal 3-3. Thereafter, the base station 1 periodically switches the terminal to which the null is directed, i.e., terminal 3-3→terminal 3-1→terminal 3-2→ . . . , to perform control so that the terminal to which the null is directed is selected in order (since $t_9$).

In the operation described above, if the transmission timer has expired, the process ends and then returns to the start again.

By performing such a control, even if interference occurs between the terminals due to channel variation over time, it is possible to mitigate the interference between the terminals by detecting the occurrence of the interference and performing channel estimation again.

It is to be noted that while in the present first embodiment, the terminals 3-1 to 3-3 estimate the channel states, it is possible to realize similar implementation even when the base station 1 estimates the channel states if signals are transmitted and received at the same frequency. In other words, the channel states are estimated using packets such as ACK transmitted by the terminals 3-1 to 3-3.

B. Second Embodiment

In the first embodiment described above, the terminal to which the null is directed is periodically switched; however, the present invention is not limited thereto, and when there is no application data to be transmitted from the base station 1 to any one of the terminals 3-1 to 3-3, a null is directed to this terminal, making the same process as that of the first embodiment possible. In the first embodiment, since a terminal receives no application data while the null is being directed to the terminal, the throughput is reduced; in contrast, in the present second embodiment, since the terminal to which the null is being directed need not originally receive the application data, the throughput of the entire system is not reduced.

C. Third Embodiment

In the first and second embodiments described above, the application packet is transmitted from the base station 1 to the terminals 3-1 to 3-3 at the same time using the MU-MIMO scheme. As described previously, in the MU-MIMO scheme, when the accuracy of the channel information is low, interference occurs between the terminals. Thus, in the present third embodiment, a terminal having low accuracy of channel information is excluded from a MU-MIMO transmission group, and an application packet is transmitted without using the MU-MIMO scheme, thereby avoiding the interference between the terminals.

Figure 15:
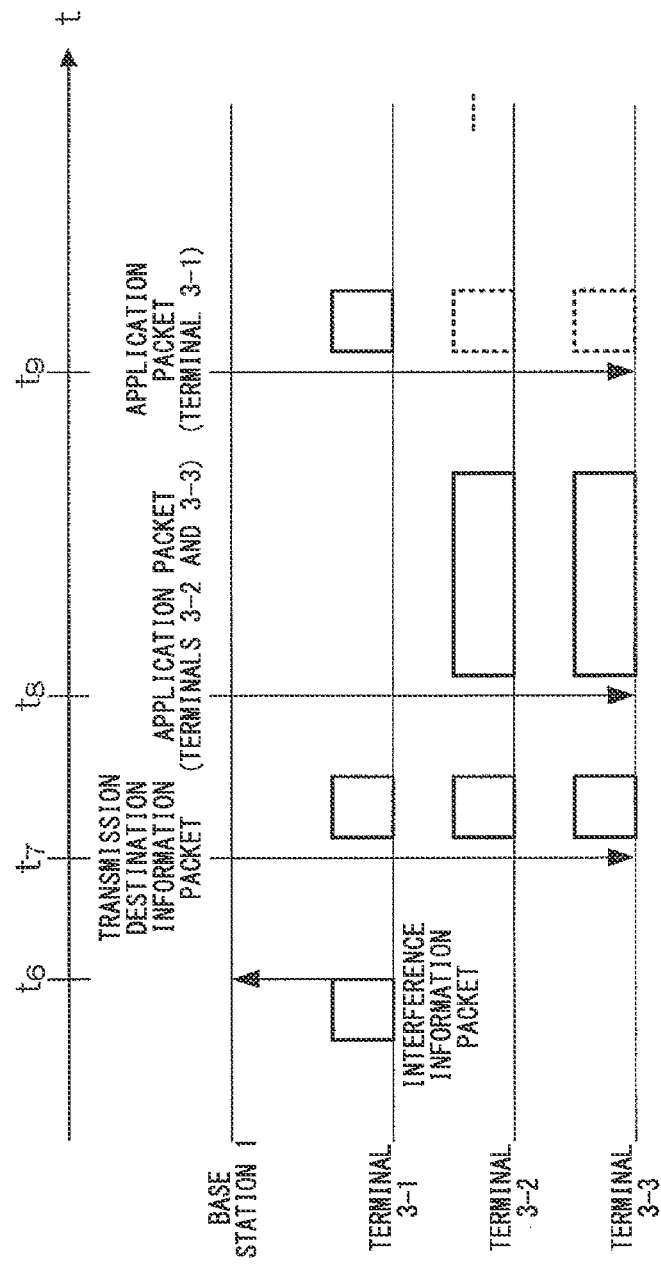
FIG. 15 is a timing chart illustrating a packet control flow of a wireless communication system in accordance with a third embodiment of the present invention.

FIG. 15 is a timing chart illustrating a packet control flow of a wireless communication system in accordance with the present third embodiment. For example, if an interference information packet is received from the terminal 3-1 ($t_6$), the base station 1 excludes the terminal 3-1 from the MU-MIMO group, determines to transmit an application packet to the terminals 3-2 and 3-3 using MU-MIMO as described above, and generates a transmission destination information packet. The base station 1 stores the identifiers of the terminals 3-2 and 3-3 as "terminals to which an application packet is to be transmitted" in the transmission destination information packet, stores "4" as a channel number used for transmission and reception of the application packet in the transmission destination information packet, and transmits the transmission destination information packet to all the terminals 3-1 to 3-3 ($t_7$).

Then, for the application packet destined for the terminals 3-2 and 3-3, the base station 1 transmits the application packet using the MU-MIMO as described above ($t_8$). In contrast, for an application packet destined for the terminal 3-1, the base station 1 transmits the application packet without using MU-MIMO ($t_9$). That is, the base station 1 transmits the application packet destined for the terminal 3-1 to all the terminals 3-1 to 3-3. The application packet is received by the terminals 3-1 to 3-3, and the terminal 3-1 recognizes and receives the packet destined for the station itself. The terminals 3-2 and 3-3 discard the packet since the packet is not destined for the stations themselves (blocks indicated by dotted lines).

D. Fourth Embodiment

The present fourth embodiment is based on the first embodiment, and the configuration of the system, the placement of channels, and the configuration of a packet are the same as those in FIGS. 1, 2, and 3, respectively. The configuration of a base station 1 is the same as that of FIG. 4.

Figure 16:
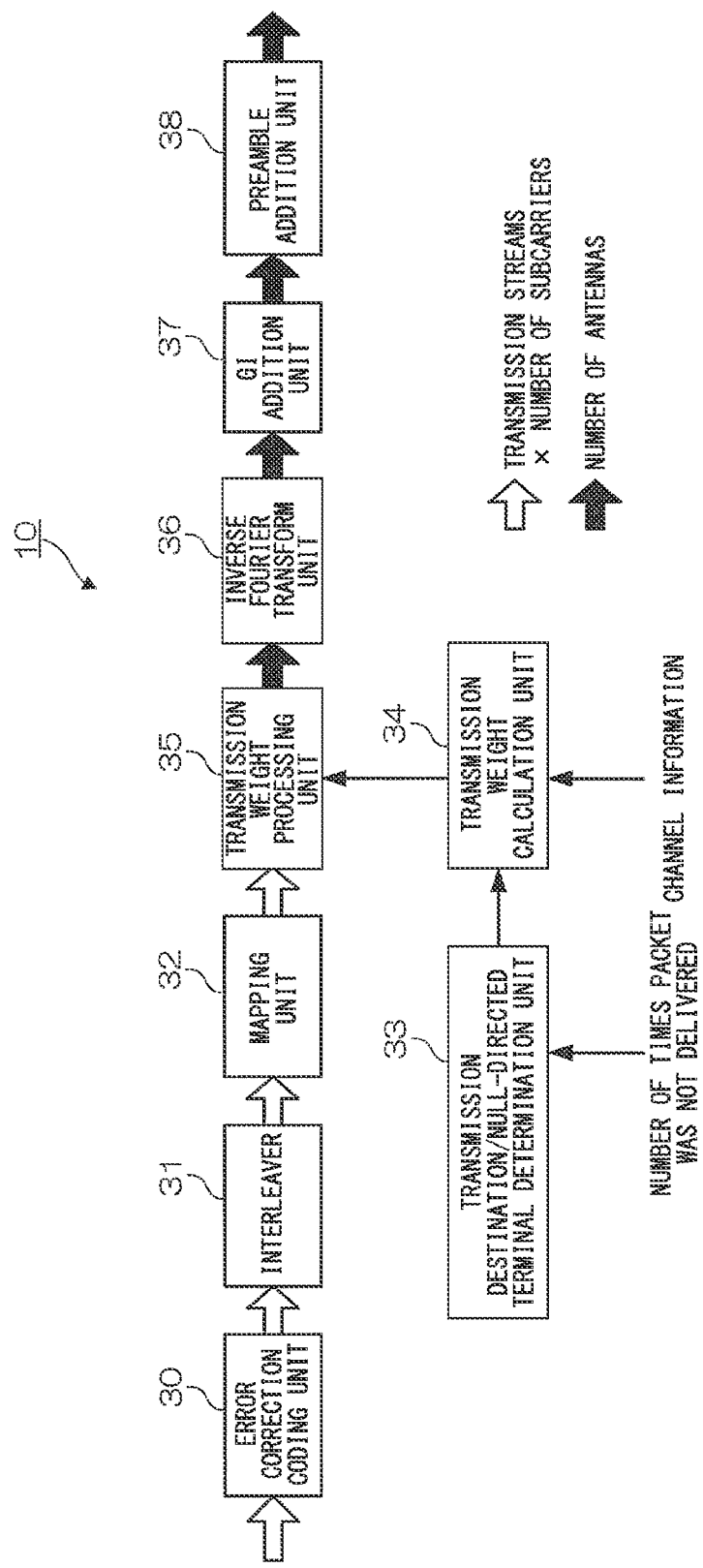
FIG. 16 is a block diagram illustrating a configuration of a transmission signal processing unit 10 of a base station 1 in accordance with a fourth embodiment of the present invention.

FIG. 16 is a block diagram illustrating a configuration of a transmission signal processing unit 10 of the base station 1 in accordance with the present fourth embodiment. The difference between FIG. 16 and FIG. 5 is that information on the number of times a packet was not delivered is input to a transmission destination/null-directed terminal determination unit 33. The configuration of a reception signal processing unit 23 is the same as that of FIG. 6. The configuration of terminals 3-1 to 3-3 is the same as that of FIG. 7. A transmission signal processing unit 50 and a reception signal processing unit 60 are the same as those of FIGS. 8 and 9, respectively.

Figure 17:
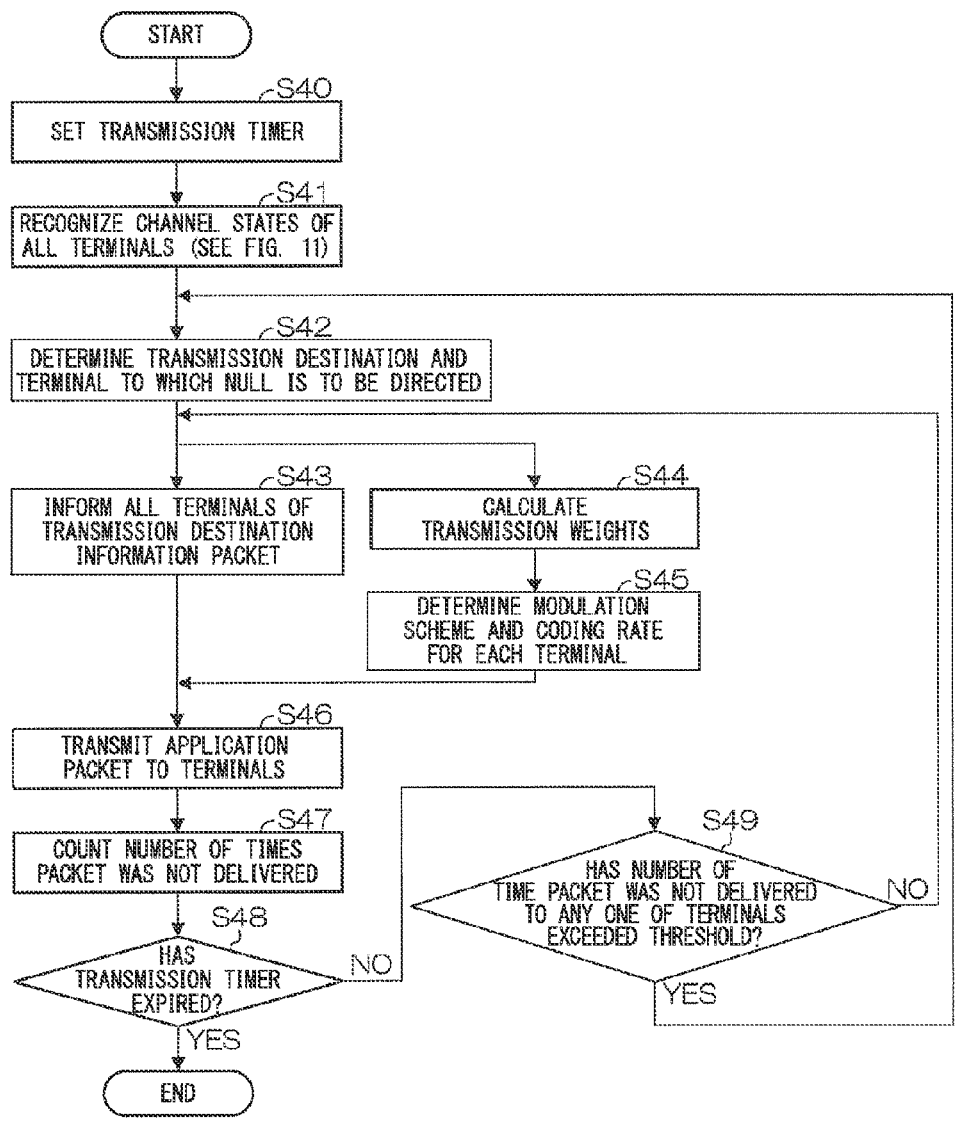
FIG. 17 is a flowchart describing an operation of the base station 1 in accordance with the present fourth embodiment.

FIG. 17 is a flowchart describing an operation of the base station 1 in accordance with the present fourth embodiment. The base station 1 sets a transmission timer (step S40) and then recognizes channel states of all the terminals 3-1 to 3-3 in accordance with FIG. 11 (step S41). Then, the base station 1 determines a terminal to which an application packet is to be transmitted and a terminal to which a null is to be directed (step S42), and informs all the terminals 3-1 to 3-3 of a transmission destination information packet (step S43). Furthermore, at the same time, the base station 1 calculates transmission weights based on the channel states of the terminals 3-1 to 3-3 (step S44), and determines a modulation scheme and a coding rate for each of data streams to be transmitted to the terminals 3-1 to 3-3 (step S45).

Thereafter, the base station 1 transmits the application packet to the terminals 3-1 to 3-3 (step S46), and the terminals 3-1 to 3-3 receive the packet. The base station 1 counts the number of times the base station 1 did not receive an ACK even though the base station 1 transmits a packet, for each of the terminals 3-1 to 3-3 (step S47). Thereafter, the base station 1 determines whether or not the transmission timer has expired (step S48); if the transmission timer has not expired, the base station 1 determines whether or not the number of times a packet was not delivered to any one of the terminals 3-1 to 3-3 has exceeded a threshold (step S49).

Then, if the number of times the base station 1 did not receive an ACK from any one of the terminals for a given number of packets exceeds the threshold, the base station 1 returns the process to step S42 to re-determine a terminal to which application data is to be transmitted and a terminal to which a null is to be directed and repeat the process described above.

In contrast, if the number of times the base station 1 did not receive an ACK for the given number of packets from any one of the terminals does not exceed the threshold, the base station 1 returns the process to step S43 and repeats the process described above.

Furthermore, if the transmission timer has expired, the base station 1 ends the process and returns to start again.

It is to be noted that the description of the process of the terminals 3-1 to 3-3 will be omitted since the process is the same as that of the flowchart shown in FIG. 12.

Figure 18:
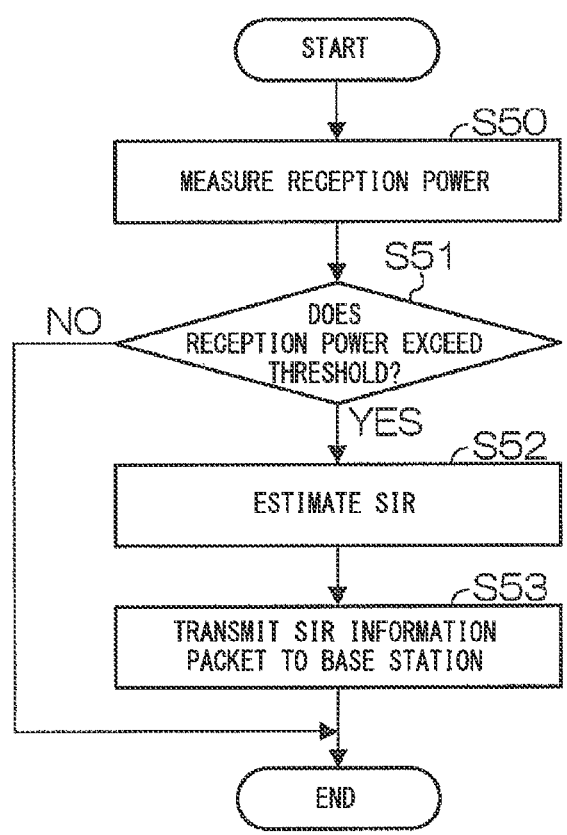
FIG. 18 is a flowchart describing an operation of a reception power measurement process of a terminal to which a null is directed in the present fourth embodiment.

FIG. 18 is a flowchart describing an operation of a reception power measurement process of the terminal to which the null is directed in the present fourth embodiment. The terminal to which the null is directed measures a reception power (step S50) and determines whether or not the reception power has exceeded a threshold (step S51). Then, if the reception power has exceeded the threshold, the terminal estimates a received signal to interference power ratio (SIR) (step S52), stores the estimated SIR in an SIR information packet, and transmits the SIR information packet to the base station 1 (step S53). In contrast, if the reception power has not exceeded the threshold, the terminal ends the process without doing anything.

Next, an example of a specific process will be described. As shown in FIG. 1, there is one base station 1 and three terminals 3-1 to 3-3, and the terminals 3-1 to 3-3 belong to the base station 1. The base station 1 and the terminals 3-1 to 3-3 use the channel Ch-4 to perform transmission and reception of a control packet (e.g., a beacon). In this case, it is assumed that the terminals 3-1 to 3-3 connect to the Internet via the base station 1 and start application communication. Access of the base station 1 and the terminals 3-1 to 3-3 is controlled in accordance with CSMA/CA (carrier sense multiple access with collision avoidance), but control is performed to transmit an application packet from the base station 1 to the terminals 3-1 to 3-3 immediately after a transmission destination information packet is transmitted from the base station 1 to the terminals 3-1 to 3-3.

The threshold for the number of times a packet was not delivered is set to 10 (per 100 packets). As shown in FIG. 23, the terminals 3-1 to 3-3 can deal with a plurality of sets of modulation schemes and coding rates with different transmission rates. There is an optimal set corresponding to the SIR. The set with a lower transmission rate has higher interference resistance since energy per symbol and redundancy are great.

Figure 19:
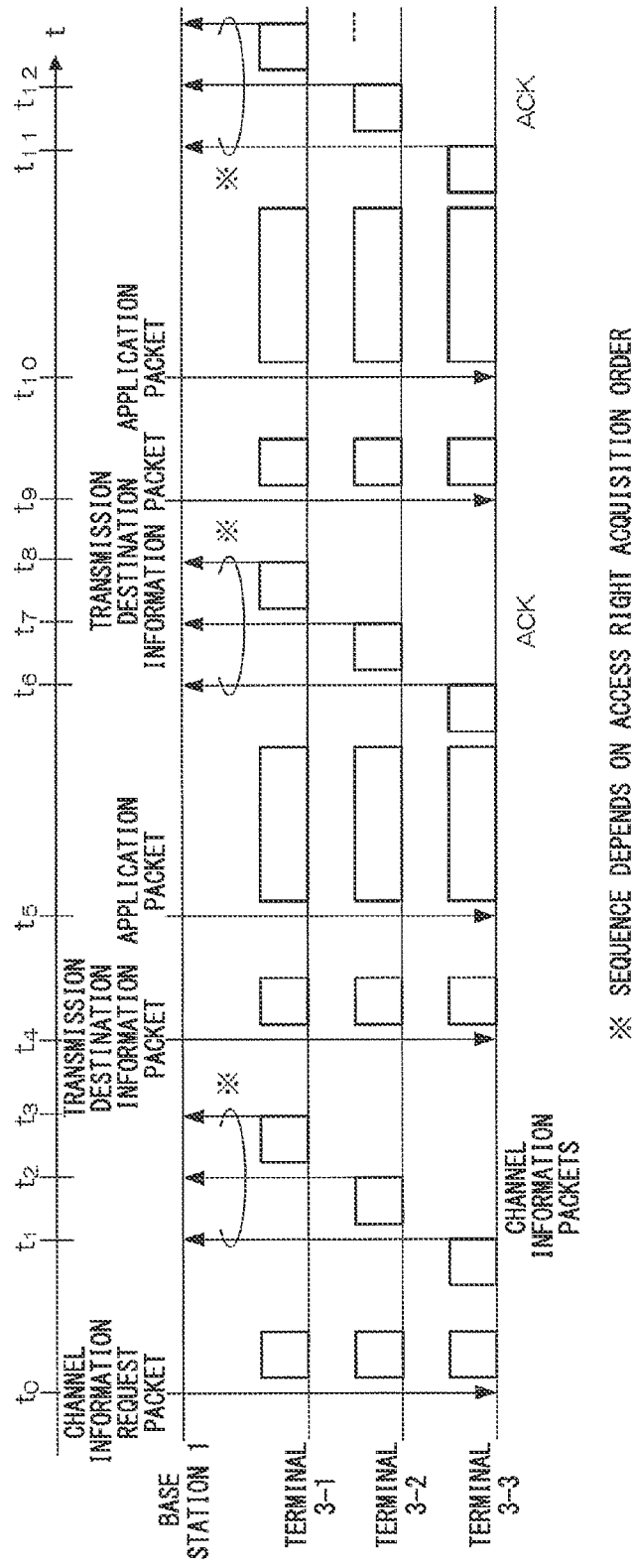
FIG. 19 is a timing chart illustrating a packet control flow of a wireless communication system in accordance with the present fourth embodiment.
Figure 20:
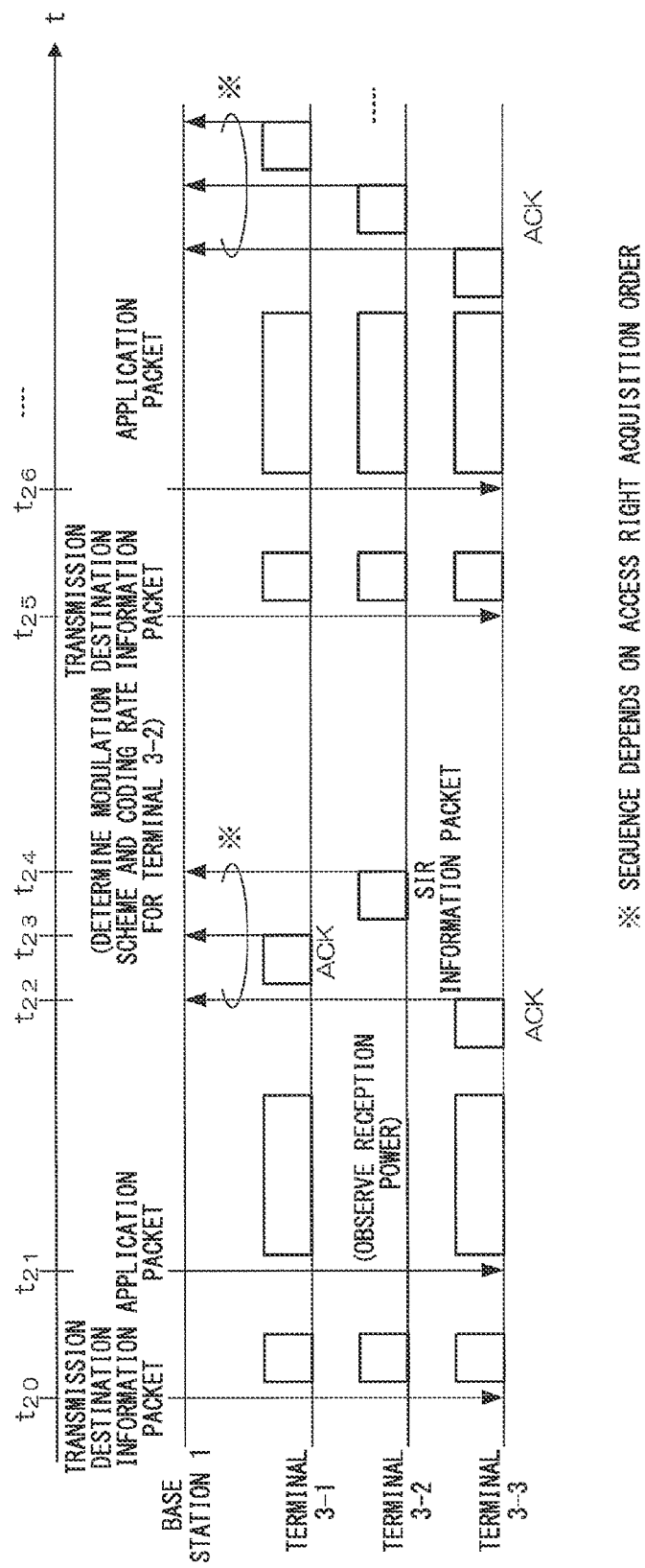
FIG. 20 is a timing chart illustrating a packet control flow of the wireless communication system in accordance with the present fourth embodiment.

FIGS. 19 and 20 are timing charts illustrating a packet control flow of a wireless communication system in accordance with the present fourth embodiment. Similar to the first embodiment, the base station 1 transmits a channel information request packet to all the terminals 3-1 to 3-3 ($t_0$), and all the terminals 3-1 to 3-3 that have received the packet estimate channel states and transmit channel information packets to the base station 1 ($t_1$ to $t_3$). The base station 1 receives the channel information packets from all the terminals 3-1 to 3-3 and delivers channel information to the transmission weight calculation unit 34 in the transmission signal processing unit 10. Next, the base station 1 determines a terminal to which an application packet is to be transmitted and a terminal to which a null is to be directed.

First, the base station 1 determines not to direct a null to any of the terminals 3-1 to 3-3 and to transmit an application packet to all the terminals 3-1 to 3-3. The base station 1 stores identifiers of the terminal 3-1, 3-2, and 3-3 as "terminals to which an application packet is to be transmitted" and stores "4" as a channel number used for transmission and reception of the application packet in a transmission destination information packet, and transmits the transmission destination information packet to all the terminals 3-1 to 3-3 ($t_4$). The terminals 3-1 to 3-3 receive the transmission destination information packet and recognize that they are the "terminals to which an application packet is to be transmitted".

The terminals 3-1 to 3-3 each set the frequency of a local signal and the pass band of the LPF 58 to be able to receive a signal that is transmitted via a channel having the channel number "4". Furthermore, at the same time, the base station 1 calculates a transmission weight for each subcarrier from the delivered channel information so that signals reach the terminals 3-1, 3-2, and 3-3. Furthermore, the base station 1 determines a modulation scheme and a coding rate for each of streams to be transmitted to the terminals 3-1 to 3-3. These initial values are determined so that each stream is transmitted in a 24 Mbps mode. Thereafter, the base station 1 sets the error correction coding unit 30 and the mapping unit 32 so that the streams can be transmitted in the 24 Mbps mode, and transmits the application packet to the terminals 3-1, 3-2, and 3-3 ($t_5$).

The terminals 3-1 to 3-3 each receive and decode the application packet and deliver a resultant packet to an upper layer. If the packet has been successfully received, the terminals 3-1 to 3-3 each transmit an ACK packet to the base station 1 ($t_6$ to $t_8$). At the same time, the terminals 3-1 to 3-3 each store a reception power at the time of receiving the application packet. Thereafter, an application packet is transmitted from the base station 1 to the terminals 3-1 to 3-3 ($t_{10}$), and if the application packet is successfully received, an ACK packet is transmitted from each of the terminals 3-1 to 3-3 to the base station 1 (since $t_{11}$).

The base station 1 counts the number of times the base station 1 did not receive an ACK packet despite having transmitted a packet. For example, assuming that the numbers of times delivery has failed per 100 packets for the terminals 3-1, 3-2, and 3-3 are 5, 13, and 0, respectively, since the number of times the base station 1 did not receive an ACK from the terminal 3-2 for a given period exceeds the threshold, the base station 1 determines to direct a null to the terminal 3-2 and transmit an application packet to the terminal 3-1 and the terminal 3-3. Thereafter, the base station 1 stores the identifiers of the terminals 3-1 and 3-3 as "terminals to which an application packet is to be transmitted" in a transmission destination information packet, stores the identifier of the terminal 3-2 as "a terminal to which a null is to be directed" in the transmission destination information packet, and transmits the transmission destination information packet to all the terminals 3-1 to 3-3 ($t_{20}$ of FIG. 20). The terminals 3-1 and 3-3 each receive and decode the application packet and deliver a resultant packet to the upper layer, and the terminal 3-2 observes a reception power ($t_{21}$).

If the terminals 3-1 and 3-3 successfully receive the packet, the terminals 3-1 and 3-3 transmit ACK packets to the base station 1 ($t_{22}$ and $t_{23}$). The terminal 3-2 observes reception powers for a given period, and then averages the reception powers to calculate an interference power. Next, the terminal 3-2 calculates an SIR from the reception power stored at the time of receiving the packet and the interference power, stores the calculated SIR in an SIR information packet, and transmits the SIR information packet to the base station 1 ($t_{24}$). The base station 1 receives the SIR information packet and then extracts the SIR information. This SIR information is used to determine a modulation scheme and a coding rate of a stream to be transmitted to the terminal 3-2. The base station 1 determines to transmit an application packet to the terminals 3-1, the terminal 3-2, and the terminal 3-3 again, sets the modulation scheme and the coding rate of the stream to be transmitted to the terminal 3-2 in accordance with the SIR information, transmits a transmission destination information packet to all the terminals 3-1 to 3-3 ($t_{25}$), and then transmits an application packet to all the terminals 3-1 to 3-3 ($t_{26}$).

By performing such a control, an interference amount is observed and the modulation scheme and the coding rate are appropriately set even if the channel estimation accuracy is low or even if interference from another cell or another system occurs. Accordingly, communication resistant to interference becomes possible.

Furthermore, in the present fourth embodiment, the channel states are estimated by the terminals 3-1 to 3-3; however, similar implementation can be performed even when the channel states are estimated by the base station 1 if signals are transmitted and received at the same frequency.

E. Fifth Embodiment

In the fourth embodiment described above, the terminal to which the null is directed is determined based on the number of times a packet was not delivered. However, the same advantageous effect as that in the fourth embodiment is achieved even when a bit error rate or a packet error rate is used. In this case, it is necessary to feed information on the error rate from the terminals 3-1 to 3-3 back to the base station 1. The terminals 3-1 to 3-3 observe error rates for a given period and periodically transmit the error rates to the base station 1, so that the base station 1 can obtain information on the error rates in the terminals 3-1 to 3-3, making the same process possible.

F. Sixth Embodiment

In the fourth embodiment described above, when interference due to low accuracy of channel estimation, interference from another cell or another system, or the like occurs, the process of increasing durability against the interference by appropriately setting the modulation scheme and the coding rate is performed. As another scheme of avoiding the interference from another cell or another system, there is a process of changing a channel operated by the base station 1 when the interference from the other cell or the other system occurs.

In the first to fifth embodiments described above, the channel having the channel number "4" is used, but if a base station of another cell or another system operates at the frequency of this channel, there is a possibility that interference occurs depending on the distance, the transmission power, or the like. Therefore, the channel used for operation by the base station 1 is switched to a channel other than "4" to avoid the interference.

Assuming the base station 1 and the terminals 3-1 to 3-3 as in the first embodiment, when the base station 1 receives interference information packets from the terminals 3-1 to 3, the base station 1 informs the terminals 3-1 to 3-3 of a channel change and then changes the channel to operate. For example, informing the terminals 3-1 to 3-3 of the channel change may be realized using the framework of IEEE 802.11h.

G. Seventh Embodiment

In the fourth embodiment described above, the process of increasing durability against interference by appropriately setting the modulation scheme and coding rate is performed. However, when the modulation scheme and the coding rate are used to increase the durability against interference, the transmission rate is reduced and the throughput decreases. When the interference is caused by a temporal variation of a channel, the interference is likely to be mitigated by performing channel estimation again, as in the first embodiment. In the present seventh embodiment, the process is divided into two steps in order to mitigate the interference.

Figure 21:
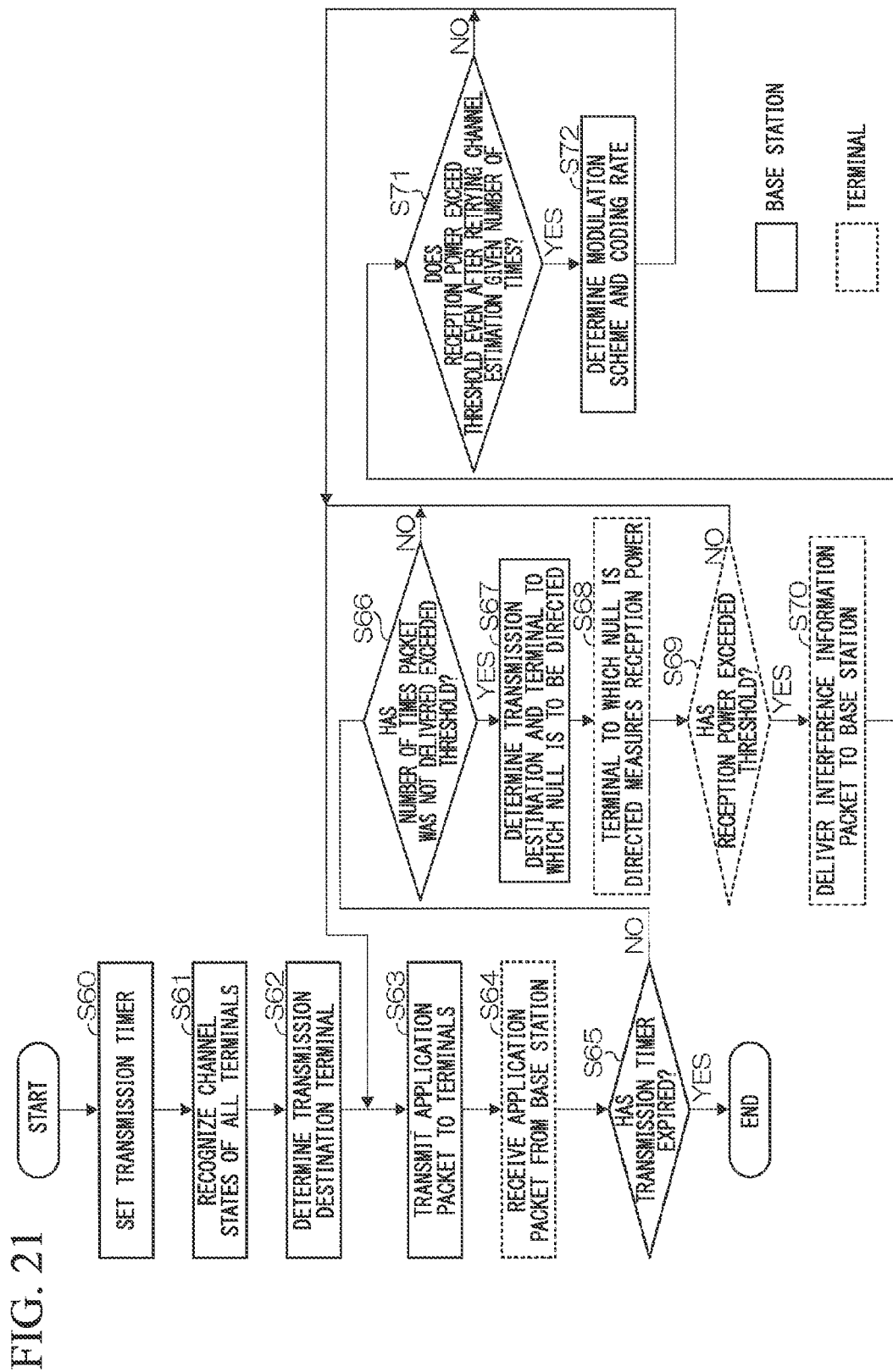
FIG. 21 is a flowchart describing an operation of a wireless communication system in accordance with a seventh embodiment of the present invention.

FIG. 21 is a flowchart describing an operation of a wireless communication system of the present seventh embodiment. Solid lines indicate processes of the base station 1 and dotted lines indicate processes of the terminals 3-1 to 3-3. The base station 1 sets a transmission timer (step S60), requests all the terminals 3-1 to 3-3 to provide channel information, acquires the channel information of each of the terminals 3-1 to 3-3, and recognizes channel states (step S61). Next, the base station 1 determines a terminal to which transmission is to be performed (step S62), calculates transmission weights based on the channel states of the terminals 3-1 to 3-3, and transmits an application packet (step S63). The terminals 3-1 to 3-3 each receive and decode the application packet and deliver a resultant packet to an upper layer (step S64).

Thereafter, the base station 1 determines whether or not the transmission timer has expired (step S65); if the transmission timer has not expired, the base station 1 determines whether or not the number of times a packet was not delivered to any one of the terminals 3-1 to 3-3 exceeds a threshold (step S66). If there is a terminal for which the number of times a packet was not delivered exceeds the threshold, the base station 1 determines to direct a null to this terminal (step S67), calculates transmission weights again, and transmits an application packet to the other terminals. The terminal to which the null is directed observes a reception power for a given period (step S68). The terminal to which the null is directed then determines whether or not the reception power exceeds the threshold (step S69); if the reception power exceeds the threshold, the terminal to which the null is directed determines that interference has occurred, and transmits an interference information packet to the base station 1 (step S70).

The base station 1 transmits a channel information request packet to the terminals 3-1 to 3-3, the terminals 3-1 to 3-3 estimate channel states, and then the terminals 3-1 to 3-3 transmit channel information packets to the base station 1. The base station 1 determines whether or not the reception power exceeds the threshold even after retrying the channel estimation a given number of times (step S71); if the reception power exceeds the threshold even when the estimation of the channel states has been performed the given number of times, the base station 1 determines that the interference cannot be mitigated, and changes the modulation scheme and the coding rate in order to increase the interference resistance (step S72).

By performing such a control, it is possible to estimate occurrence of the interference and efficiently mitigate the interference.

It is to be noted that if the rate that packets were not delivered exceeds a threshold, but the reception power observed for a given period during which the null is being directed does not exceed the threshold, factors other than interference may be considered. For example, there is a possibility that the distances between the base station 1 and the terminals 3-1 to 3-3 are great and a reception intensity of a signal transmitted from the base station 1 is reduced. Even in this case, there is a possibility that communication is possible by changing the modulation scheme and the coding rate even with low reception intensity.

H. Eighth Embodiment

The first and fourth embodiments described above assume that the terminals 3-1 to 3-3 each have one antenna, but similar implementation is possible even when the terminals 3-1 to 3-3 each have a plurality of antennas. For example, a null may be directed to one of the antennas of each of the terminals 3-1 to 3-3, and an application packet may be transmitted and received using the other antennas.

Figure 22:
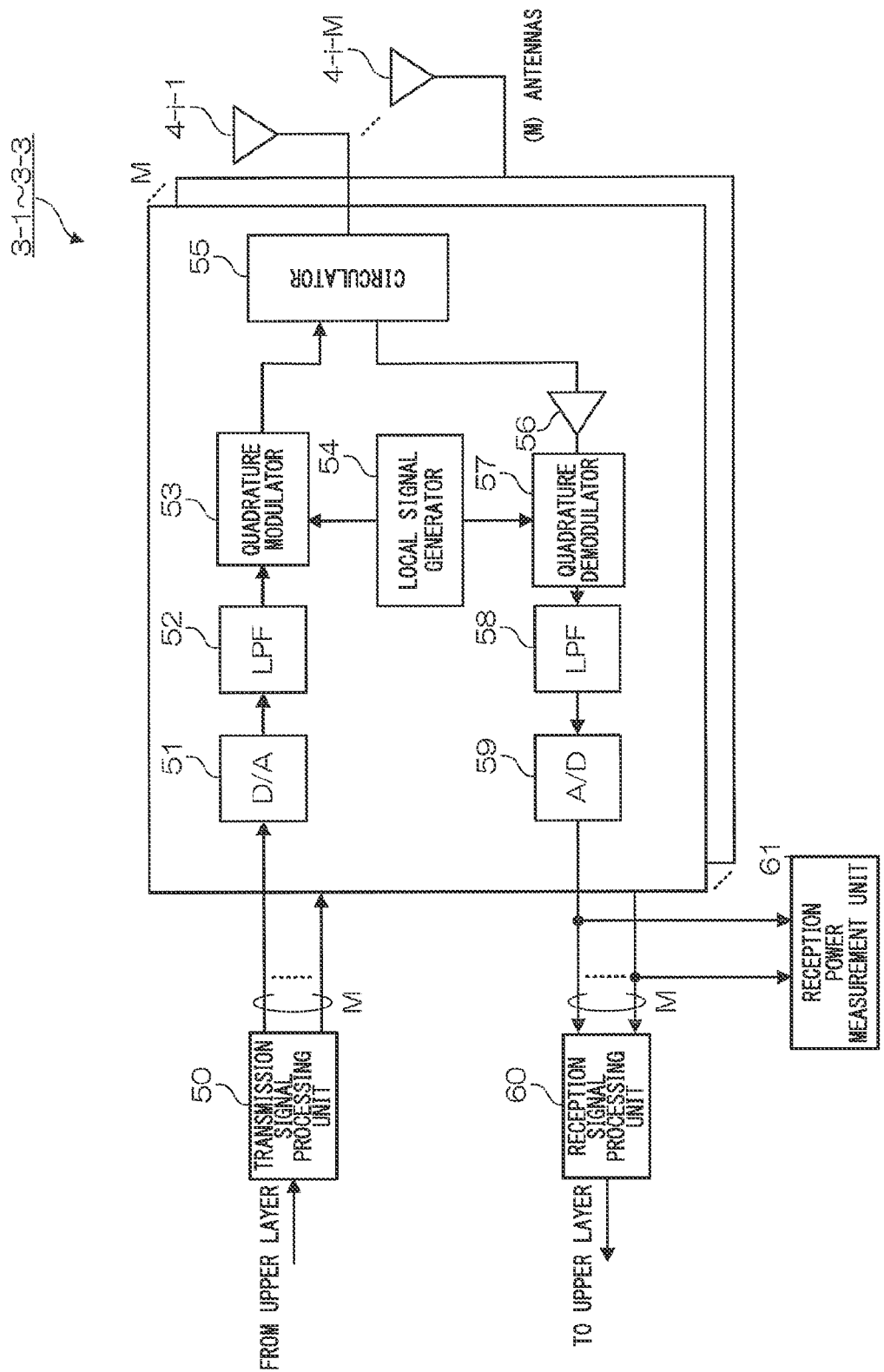
FIG. 22 is a block diagram illustrating a configuration of a terminal of a wireless communication system in accordance with an eighth embodiment of the present invention.

FIG. 22 is a block diagram illustrating a configuration of a terminal in a wireless communication system in accordance with the present eighth embodiment. It is to be noted that parts corresponding to those in FIG. 7 are denoted by the same reference symbols and a description thereof will be omitted. Terminals 3-1 to 3-3 in accordance with the present eighth embodiment have a configuration that measures reception powers of signals output from antennas 4-i-1 to 4-i-M (i=1, 2, 3). With such a process and configuration, it is possible to estimate occurrence of interference while receiving an application packet.

Hereinafter, wireless communication systems and base station apparatuses in accordance with ninth and tenth embodiments of the present invention will be described with reference to the accompanying drawings.

I. Ninth Embodiment

Figure 24:
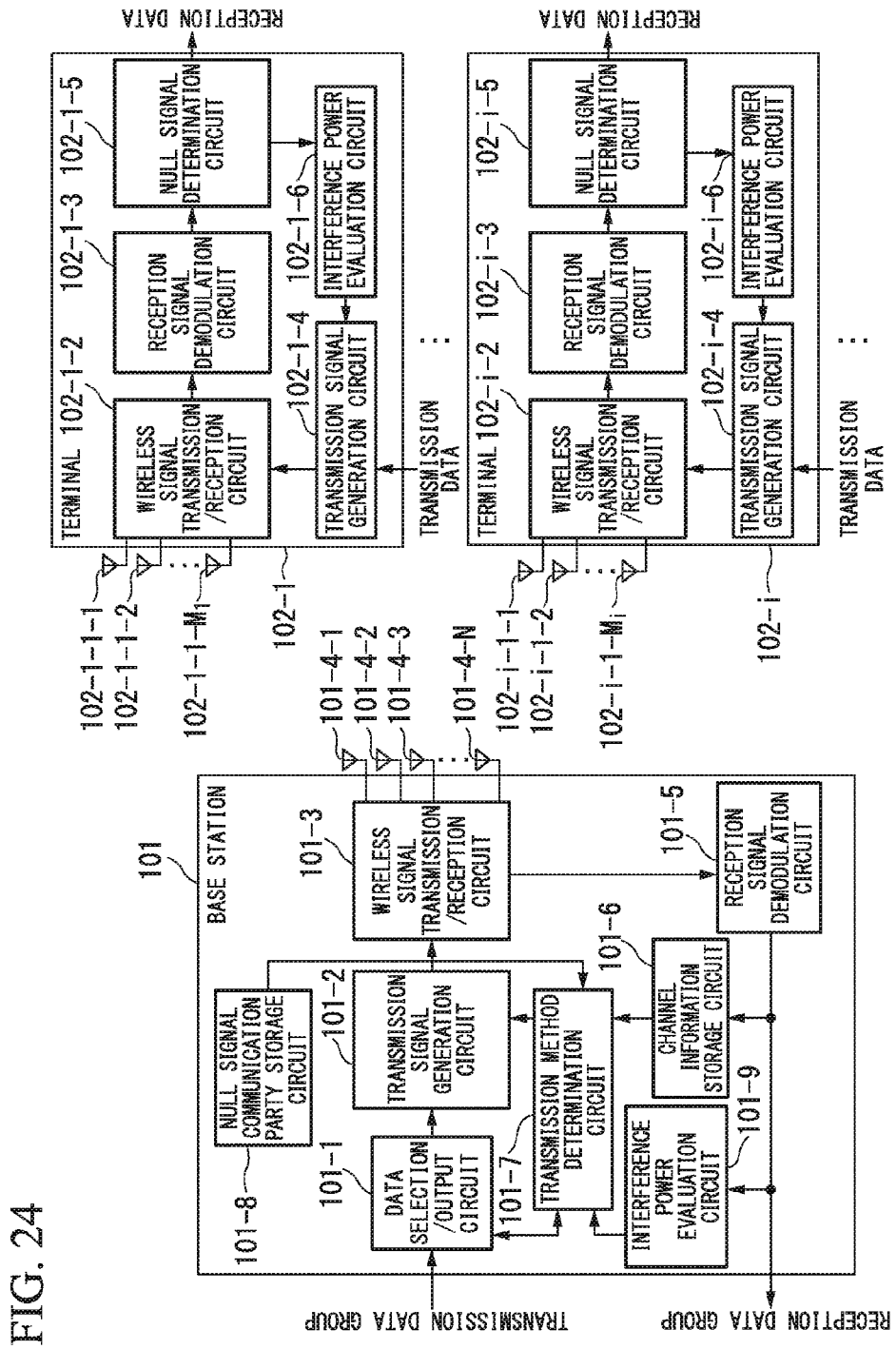
FIG. 24 is a schematic block diagram illustrating a wireless communication system in accordance with a ninth embodiment of the present invention.

FIG. 24 is a schematic block diagram illustrating the wireless communication system in accordance with the ninth embodiment of the present invention.

In FIG. 24, 101 indicates a base station, 102-1 to 102-i indicate terminals, 101-1 indicates a data selection/output circuit, 101-2 and 102-1-4 to 102-i-4 indicate transmission signal generation circuits, 101-3 and 102-1-2 to 102-i-2 indicate wireless signal transmission/reception circuits, 101-4-1 to 101-4-N, 102-1-1-1 to 102-1-1-M₁, and 102-i-1-1 to 102-i-1-M_i indicate transmission/reception antennas, 101-5 and 102-1-3 to 102-i-3 indicate reception signal demodulation circuits, 101-6 indicates a channel information storage circuit, 101-7 indicates a transmission method determination circuit, 101-8 indicates a null signal communication party storage circuit, 101-9 indicates an interference power evaluation circuit, 102-1-5 to 102-i-5 indicate null signal determination circuits, and 102-1-6 to 102-i-6 indicate interference power evaluation circuits. Here, 1≤i≤K, K denotes the number of the terminals, $M_i$ denotes the number of the transmission/reception antennas of the $i^{th}$ terminal 102-i, and N denotes the number of the transmission/reception antennas of the base station 101.

Transmission from the base station to the terminals is considered. The data selection/output circuit 101-1 sends information on a communication party to which output is possible, to the transmission method determination circuit 101-7. The transmission method determination circuit 101-7 determines a communication party in the same manner as in the background art, determines a spatial multiplexing order, transmission weights, a modulation scheme, and a coding scheme for the communication party, and outputs them to the data selection/output circuit 101-1 and the transmission signal generation circuit 101-2. In this case, when a null signal terminal is specified from the null signal communication party storage circuit 101-8, in calculating the transmission weights, the transmission method determination circuit 101-7 determines the transmission weights so that inter-user interference does not occur for the null signal terminal, using channel information of the null signal terminal. A method for selecting the null signal terminal will be described below. If a channel matrix of a $j^{th}$ frequency channel for the null signal terminal is assumed to be $H_{NULL,j}$, the aggregate matrix of Equation 2 is newly defined as:

$$H_{i,j}^{+} = \begin{pmatrix} R_{1,j}H_{1,j} \\ \vdots \\ R_{i-1,j}H_{i-1,j} \\ R_{i+1,j}H_{i+1,j} \\ \vdots \\ R_{K,j}H_{K,j} \\ R_{NULL,j}H_{NULL,j} \end{pmatrix}$$ [Equation 6]

Here, $R_{NULL,j}$ denotes reception weights in the null signal terminal, and if $R_{NULL,j}$ is a diagonal matrix whose diagonal elements are 1, it shows a case in which the transmission weights are determined under a condition of being orthogonal to all the antennas without assuming the reception weights for the null signal terminal. Furthermore, control may be performed so that a null is directed to only a desired antenna by setting any one element in one row vector (a 1×$M_{NULL}$ vector) of $R_{NULL,j}$ to 1 and the other elements to 0 ($M_{NULL}$ denotes the total number of reception antennas of the null signal terminal). Singular value decomposition is performed on the obtained aggregate matrix in the same manner as Equation 3 and the transmission weights are determined using Equation 4. There may be a plurality of null signal terminals. For example, if the terminals 102-1 and 102-2 are the null signal terminals, $R_{NULL,j}$=diag $(R_{1,j}, R_{2,j})$ and $H_{NULL,j}$=$(H_{1,j}{}^{T} H_{2,j}{}^{T})^{T}$. Here, diag(A, B) is a matrix whose diagonal elements are matrixes A and B and the other elements are 0.

The null signal terminal is specified by the null signal communication party storage circuit 101-8. The null signal communication party storage circuit 101-8 may set, as the null signal terminal, a terminal that has not performed MU-MIMO communication, a terminal that has not performed communication for a given period, a terminal that has not been specified as the null signal terminal for a given period, a terminal that have caused some problem such as no ACK being returned from the terminal after performing MU-MIMO communication, or a terminal to which a notification that the terminal itself is the null signal terminal has been made. Furthermore, a second base station may be specified as the null signal terminal. The null signal communication party storage circuit 101-8 stores information for identifying a terminal set as the null signal terminal.

The transmission method determination circuit 101-7 selects a modulation scheme, a coding scheme, and the like to be used for the current transmission, for example, using information of an SNR (signal-to-noise ratio) of a communication party terminal, an inter-user interference condition, the number of row vectors of the aggregate matrix defined by Equation 6, a singular value of $H_{i,j} V''^{+}_{i,j}$, and transmission quality at the time of previous communication. Alternatively, the transmission method determination circuit 101-7 may prepare a table of a modulation scheme, a coding rate, and a spatial multiplexing order that correspond to each other from an SNR obtained based on a ratio of the value of the square of the singular value of $H_{i,j} V''^{+}_{i,j}$ and thermal noise power obtained in each frequency channel, and the number of elements of reception antennas of the terminal in advance, and determine the modulation scheme, the coding rate, and the spatial multiplexing order in accordance with the correspondence table.

When the communication party to which transmission is to be performed is specified by the transmission method determination circuit 101-7, the data selection/output circuit 101-1 outputs transmission data destined for the corresponding communication party to the transmission signal generation circuit 101-2. The data selection/output circuit 101-1 calculates a duration in which an interference power does not exceed a predetermined maximum interference power from information of the interference power and an increased amount of the interference power estimated for the terminal, and determines the maximum data length that can be set for the terminal. The transmission signal generation circuit 101-2 performs modulation and coding on an input transmission signal, multiplies a resultant signal by transmission weights, inserts a pilot signal, and outputs a resultant signal to the wireless signal transmission/reception circuit 101-3. This pilot signal is used for signal detection and delivery of communication information; for the delivery of the communication information, the null signal terminal may be notified that the terminal itself is a null signal terminal, using some bits of the pilot signal. For example, bits for specifying the null signal terminal may be assigned as null signal IDs in the pilot signal in advance, and the corresponding null signal IDs may be sent to terminals that are candidates for the null signal terminal. In this case, a terminal determines that the terminal itself is the null signal terminal from the null signal IDs specified by the pilot signal in the received signal. Alternatively, the terminal may recognize that the terminal itself is the null signal terminal when the spatial multiplexing order has been specified as 0 using bits for notifying of the spatial multiplexing order of a data signal. The wireless signal transmission/reception circuit 101-3 up-converts the input signal to a carrier frequency, and transmits a resultant signal via at least one of the transmission/reception antennas 101-4-1 to 101-4-N.

Each of K terminals that are communication parties inputs a wireless signal received via an antenna provided in the terminal to the wireless signal transmission/reception circuit included in the terminal itself. In an $i^{th}$ terminal, the signal received via at least one of the antennas 102-$i$-1-1 to 102-$i$-1-$M_i$ is down-converted from the carrier frequency by the wireless signal transmission/reception circuit 102-$i$-2 and input to the reception signal demodulation circuit 102-$i$-3. The reception signal demodulation circuit 102-$i$-3 establishes synchronization with a received packet, decodes a signal, and outputs data.

Here, if the null signal determination circuit 102-$i$-5 detects that the bits for specifying the terminal itself as the null signal terminal have been inserted into the decoded data or if the null signal determination circuit 102-$i$-5 detects that a reception power of a data portion has rapidly decreased (for example, if a reception signal power of the data portion is smaller than a reception power of the pilot portion by an amount that is greater than or equal to a predetermined reference), the null signal determination circuit 102-$i$-5 detects the terminal itself as the null signal terminal and outputs the reception signal in a signal section in which there is no data destined for the terminal itself, to the interference power evaluation circuit 102-$i$-6. Furthermore, using $R_{NULL,j}$ as the reception weights, it may be detected whether or not the reception signal of the data portion in the reception signal corresponding to the reception weights is rapidly reduced compared to the reception signal of the pilot signal. When weights for selecting an antenna (a vector in which one of the elements is 1 and the other elements are 0) are used as a row vector of $R_{NULL,j}$, it may be detected whether or not the terminal itself is specified as the null signal terminal using a reception signal of the corresponding antenna. The signal section in which there is no data destined for the terminal itself is a section in which a data portion in which the reception power becomes small is received, the width of which in a vertical direction being small as depicted in FIGS. 25 to 28 that will be described below. Although the interference power evaluation circuit 102-$i$-6 receives the reception signal represented by Equation 5, since a signal destined for the terminal itself has not been transmitted, the first term at the right side in the second line of Equation 5 becomes 0. That is, the second term at the right side in the second line of Equation 5 can be estimated by simply measuring the reception signal in the data section, and this value is stored as the inter-user interference power. In this case, the inter-user interference power may be stored as a ratio of an inter-user interference power to a noise power of thermal noise. Furthermore, the interference power evaluation circuit 102-$i$-6 measures the reception power of the null signal portion at two or more timings, and records information on an increase amount of the interference power, thereby modulating, coding, and transmitting the interference power and the increase amount of the interference power or information on the interference power obtained by applying a function to the interference power and the increase amount of the interference power.

On the other hand, in transmission from the terminals to the base station, when transmission data is generated or when reception ends and a notification of an interference power is performed, the transmission signal generation circuit 102-$i$-4 adds a control frame such as a pilot signal to a signal subjected to modulation and coding, adds information on the inter-user interference input from the interference power evaluation circuit 102-$i$-6 to a portion of the signal, and outputs a resultant signal to the wireless transmission/reception circuit 102-$i$-2. The wireless transmission/reception circuit 102-$i$-2 up-converts the output of the transmission signal generation circuit 102-$i$-4 to a carrier frequency and transmits a resultant signal from at least one of the transmission/reception antennas 102-$i$-1-1 to 102-$i$-1-$M_i$.

In the base station 101, the wireless signal transmission/reception circuit 101-3 down-converts the signal received via at least one of the antennas 101-4-1 to 101-4-N and outputs a resultant signal to the reception signal demodulation circuit 101-5. Channel information used for demodulation or fed-back channel information between the terminal and the base station included in a demodulation signal is input to the channel information storage circuit 101-6. If information on the inter-user interference is present in a reception signal, the information on the inter-user interference is input to the interference power evaluation circuit 101-9, and the interference power evaluation circuit 101-9 stores the information on the inter-user interference for each user. In this case, the inter-user interference information may be corrected using the number of multiplexed users and/or a power distribution condition, or the information on the inter-user interference may be stored for each of combinations of users. Here, a combination of users refers to a set of the $1^{st}$ to $K^{th}$ terminals and the null signal terminal used in the aggregate matrix in Equation 6.

In this way, it is possible to evaluate the inter-user interference without affecting communication quality by intentionally providing a communication party to which a signal is not transmitted (the null signal terminal). Even if the inter-user interference is increased due to a channel estimation error, a load such as retransmission of data is not applied since no data is transmitted. That is, in the interference power evaluation circuit 101-9 of the base station 101, the reception signal in the null signal terminal may be represented as:

$$y'_{i,j} = \sum_{\substack{l=1 \\ l \neq i}}^{K} R_{i,j} H_{i,j} W_{l,j} x_{l,j} + n_{i,j} \qquad \text{[Equation 7]}$$

since $x_{i,j}=0$ in Equation 5, and only the inter-user interference can be evaluated. The interference power evaluation circuit 101-9 may average reception signals y thus obtained in all frequency channels, $$I_i = \sum_{j=1}^{S} |y'_{i,j}|^2 = \sum_{j=1}^{S} \sum_{\substack{l=1 \\ l \neq i}}^{K} R_{i,j} H_{i,j} W_{l,j} x_{l,j} + \sum_{j=1}^{S} n_{i,j}, \qquad \text{[Equation 8]}$$

select a specific frequency channel as $I_i$ as represented by Equation 8 (the number of frequency channels is S), average selected values, or use a median value. Furthermore, signals corresponding to a plurality of OFDM symbols may be averaged, or the reception power of a signal in the time domain before performing a discrete Fourier transform (DFT) may be used as $I_i$. In any case, the inter-user interference in the terminal calculated by the interference power evaluation circuit 101-9 is used to select a combination of a modulation scheme, a coding rate, and the number of spatial streams for each terminal when simultaneous transmission to a plurality of terminals using multi-user MIMO is performed. For example, a correspondence table may be created to switch the modulation scheme and the coding rate to those having a smaller number of bits in accordance with the value of user interference, and the modulation scheme, the coding rate, and the number of spatial streams are reduced in accordance with a magnitude of the inter-user interference power, the null signal terminal may be stored so that a transmission method assuming null signal control, such as MU-MIMO communication, is not selected when the inter-user interference power is greater than a predetermined threshold.

It is to be noted that a temporal change in the inter-user interference can be evaluated by acquiring a plurality of $I_i$ at different reception timings. For example, if inter-user interference powers obtained at times $t_1$ and $t_2$ are $I_i(t_1)$ and $I_i(t_2)$, a change amount $\Delta I_i = I_i(t_2) - I_i(t_1)$ of the interference power in an elapsed time $\Delta t = t_2 - t_1$ is found. The change amount $\Delta I_i$ of the interference power may be included as interference amount information, or a value obtained by applying a function to $I_i$ and $\Delta I_i$ may be notified as interference power information. For example, if the average time required from when channel estimation is performed until when transmission is performed is assumed to be T and the inter-user interference is assumed to increase in proportion to a log of a time $\Delta t_i$, the power amount to be sent to the base station is determined by:

$$I'_i = I_i(t_2) + \Delta I_i \log(T)/(\log(t_2) - \log(t_1)) \qquad \text{(Equation 9)}$$

Alternatively, information of $I_i(t_2)$ and $\Delta I_i/(\log(t_2)-\log(t_1))$ may be sent, and the base station may evaluate the interference power using Equation 9 described above. In this case, the time required from when channel estimation is performed until when transmission is performed when communication is actually performed may be used as T.

When determining the modulation scheme and the coding scheme, a table of a modulation scheme, a coding rate, and the number of spatial streams for a signal-to-interference plus noise ratio (SINR) is created and the evaluated interference power is taken into consideration as the value of the SINR at the time of selecting them, so that a combination of a modulation scheme, a coding rate, and the number of spatial streams with a low data rate can be selected. That is, in the multi-user MIMO, when a combination of users (terminals) to which simultaneous transmission is performed has been determined, a combination of a modulation scheme, a coding rate, and the number of spatial streams can be selected in consideration of interference due to the channel estimation error that occurs between the terminals (the inter-user interference).

Furthermore, if the inter-user interference is evaluated in a given terminal before data is actually transmitted, a determination can be made as to whether or not spatial multiplexing transmission at the same time in the same frequency, including the terminal, is possible. In this way, if the inter-user interference is known in advance, it is possible to prevent loss that spatial multiplexing transmission to the terminal suffering great inter-user interference is performed and thus retransmission is performed as a result of a failure in the transmission.

In order to determine whether or not the simultaneous communication with a plurality of terminals using the same frequency is possible, when the inter-user interference $I_i$ is higher than a given level, the fact that simultaneous communication with a plurality of terminals is impossible is reported to the base station using a bit indicating this fact or only the fact that simultaneous communication with a plurality of terminals is possible or impossible is reported rather than a notification of the interference power, thereby decreasing the number of bits fed back to the base station.

Figure 25:
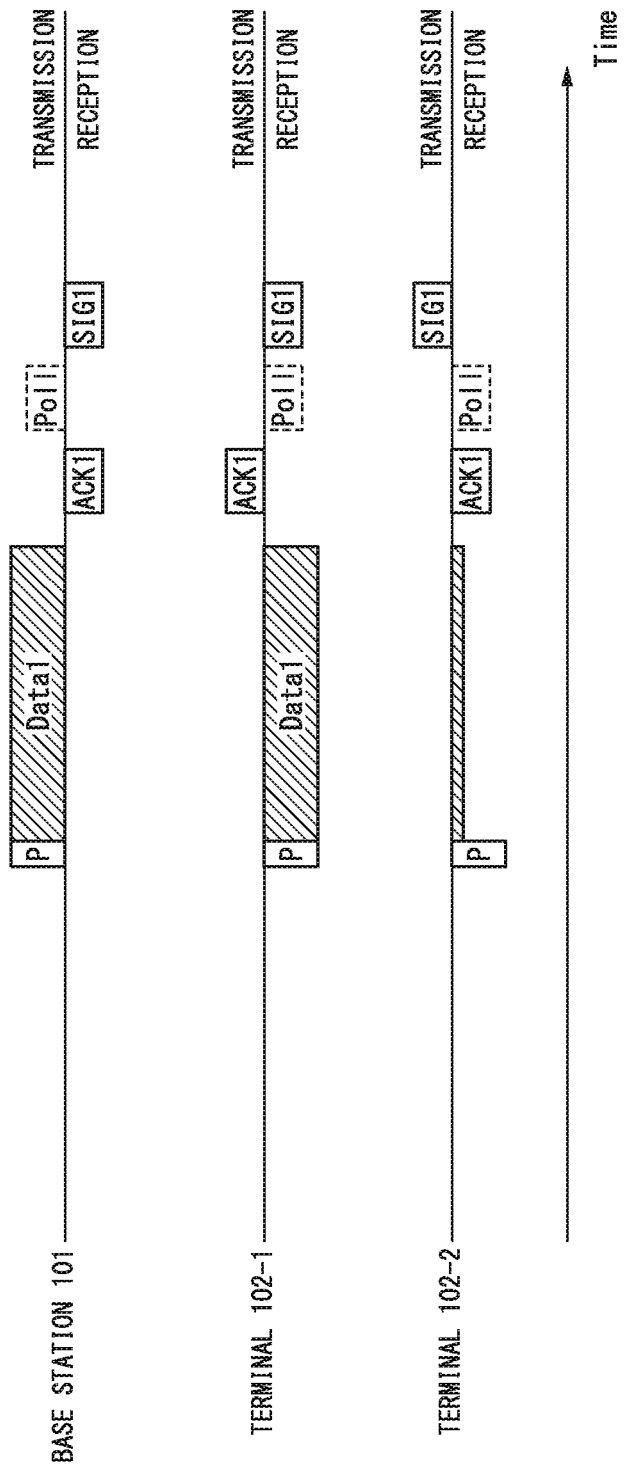
FIG. 25 is a sequence diagram illustrating a case in which data is transmitted from a base station to a terminal.

A communication method of the present embodiment will be shown using FIG. 25. FIG. 25 is a sequence diagram illustrating a case in which data is transmitted from the base station to a terminal. FIG. 25 illustrates a case in which, when the base station 101 and the terminals 102-1 and 102-2 are present, the base station 101 transmits the data to the terminal 102-1 and transmits a null data signal to the terminal 102-2. First, if the base station 101 determines a terminal to which the data is to be transmitted as the terminal 102-1 and a null signal terminal as the terminal 102-2, the base station 101 determines transmission weights, a modulation scheme, a coding scheme, and the number of data streams to be subjected to spatial multiplexing for the terminal 102-2. Calculation of the transmission weights can be performed in the same manner as a case in which simultaneous transmission to the terminals 102-1 and 102-2 is performed through spatial multiplexing, but the transmission weight destined for the terminal 102-2 is not calculated. An aggregate channel matrix $H^+_{1,j}$ for the terminal 102-1 includes only a channel matrix of the null signal terminal and, in Equation 6, $R_{NULL,j}$ is $R_{2,j}$ and $H_{NULL,j}$ is $H_{2,j}$. Thus, the aggregate channel matrix $H^+_{1,j}$ is obtained as:

$$H_{1,j}^+ = R_{2,j} H_{2,j} = U_{2,j} D_{2,j} (V'_{2,j} V''_{2,j})^H \quad \text{[Equation 9]}$$

by the singular value decomposition. The transmission weights obtained by multiplying $V''_{2,j}$ obtained here by a matrix $G_{1,j}$ may be used as transmission weights destined for the terminal 102-1. A vector obtained by applying an orthogonalization method to $H_{1,j} V''_{2,j}$ or a right singular vector obtained by performing singular value decomposition on $H_{1,j} V''_{2,j}$ may be used as $G_{1,j}$.

Furthermore, a terminal other than the terminal that is the communication party need not necessarily be set as a null signal terminal. That is, instead of newly adding the null signal terminal as in Equation 6, any one of the $1^{st}$ to $K^{th}$ terminals of the aggregate matrix represented by Equation 2 may be treated as the null signal terminal. By doing so, any one of the $1^{st}$ to $K^{th}$ terminals specified as the null signal terminal can estimate the inter-user interference power in the terminal itself while the data is being transmitted to the $1^{st}$ to $K^{th}$ terminals.

Figure 26:
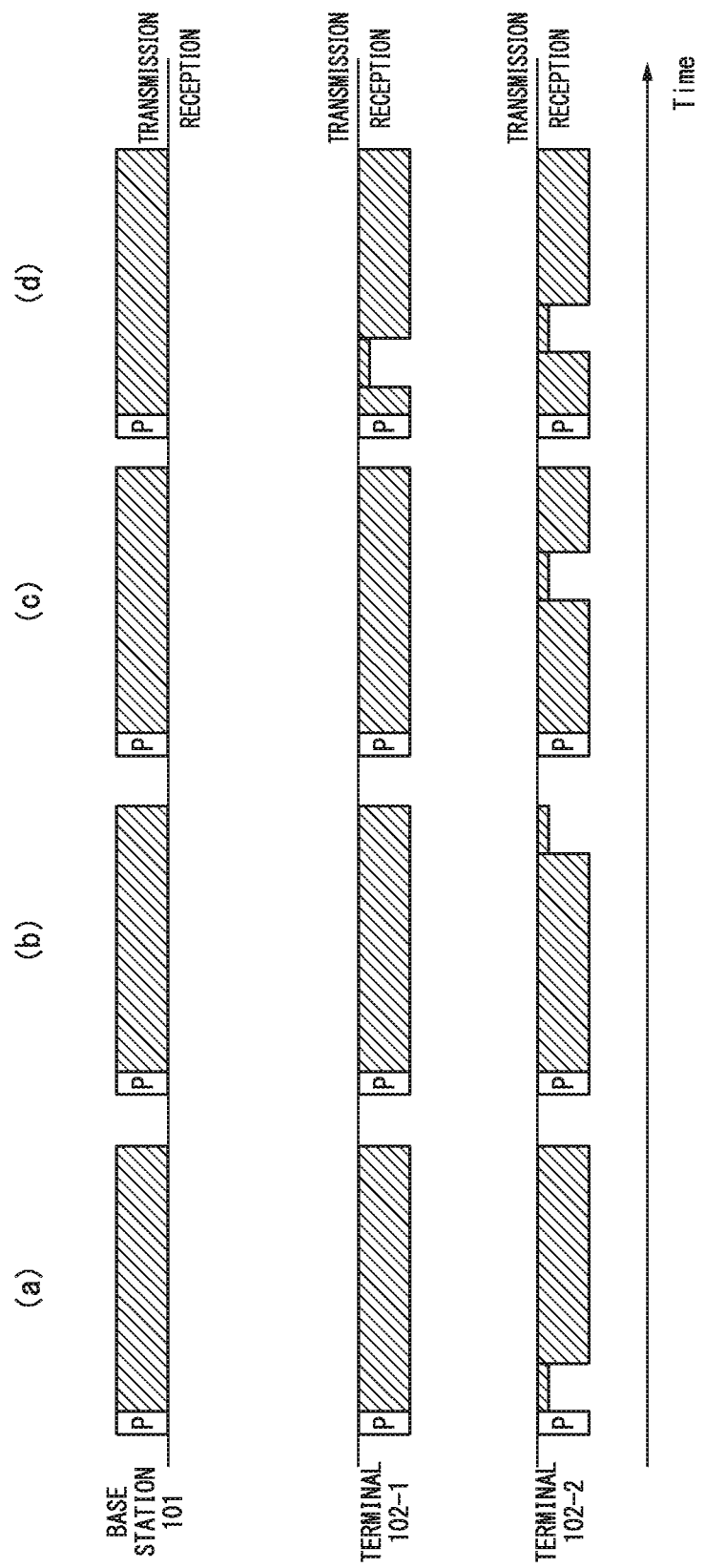
FIG. 26 is a sequence diagram illustrating a case in which data is transmitted from a base station to terminals.

For example, the inter-user interference power can be similarly evaluated by using a portion of the data section as a null signal portion in which a signal is not transmitted to the null signal terminal as shown in FIG. 26. In transmission packets shown in (a) of FIG. 26, data is transmitted to the terminal 102-1 throughout a data section, while there is no data in a beginning portion of a data section for the terminal 102-2, so that it is possible to evaluate the inter-user interference power. In transmission packets shown in (b) and (c) of FIG. 26, a null signal portion is similarly used in an end and a middle of a data section, respectively. Furthermore, the inter-user interference power can be evaluated in a plurality of terminals by setting null signal sections for the terminals at shifted positions as shown in (d) of FIG. 26. Furthermore, in FIG. 25, a notification of communication using Request to Send (RTS) and Clear to Send (CTS) may be performed before a transmission signal is transmitted.

Furthermore, the data amount can be increased in accordance with the inter-user interference amount by specifying a section in which data is to be transmitted using the method of (b) in FIG. 26. That is, since the inter-user interference due to the channel estimation error increases over time, it is anticipated that the transmission property in a first half of the data is more deteriorated than that in a second half of the data. For this reason, the data may be transmitted only in the first half and the inter-user interference may be measured in the second half, as in (b). If the inter-user interference is lower than a predetermined value, the section in which the data is transmitted can be increased. For example, the base station may perform linear interpolation using the inter-user interference powers $I_i(t_1)$ and $I_i(t_2)$ obtained at the times $t_1$ and $t_2$ and determine to transmit the data within a period in which the interference power is smaller than a predetermined interference power $I_0$. When the user interference power I is represented as $I=\alpha t+\beta$ from $I_i(t_1)$ and $I_i(t_2)$, a time t which satisfies $I<I_0$, i.e., a data length which satisfies $t<(I_0-\beta)/\alpha$, may be specified for the terminal.

Figure 27:
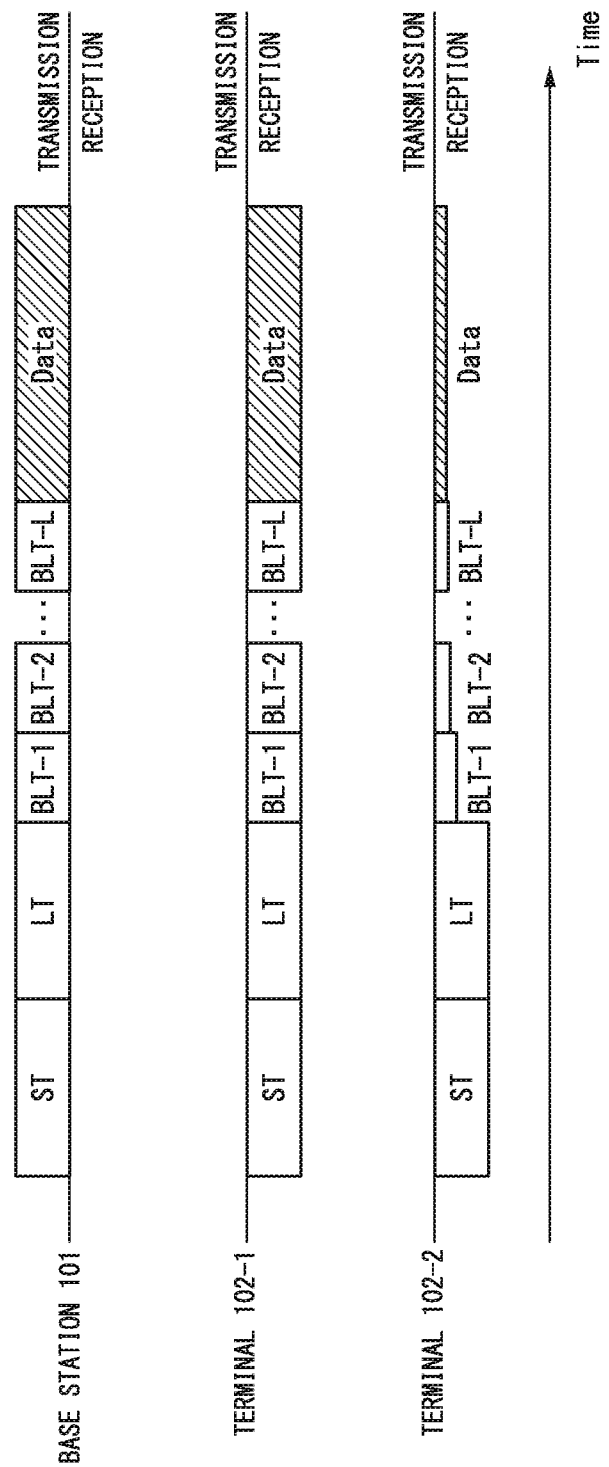
FIG. 27 is an illustrative diagram describing evaluation of inter-user interference using a pilot signal.

FIG. 27 is an illustrative diagram describing evaluation of inter-user interference using a pilot signal. While a pilot signal portion is represented as P in FIGS. 25 and 26, this portion is enlarged to show that the pilot signal portion includes a short training portion (ST), a long training portion (LT), and beam training portions (BLT). The pilot need not exactly match this, and a pilot signal indicating other information may be inserted between the signal portions, or ST and/or LT may be omitted. Here, BLT-k in the beam training portions indicates a signal multiplied by transmission weights of the $k^{th}$ beam. In FIG. 27, the terminal 102-1 is a communication terminal desired by the base station 101, and the terminal 102-2 is a null signal terminal. Since the beam training portions use transmission weights that are calculated under a condition of being orthogonal to a signal space of the terminal 102-2, the beam training portions are not originally received by the terminal 102-2, but the reception power is actually generated in the terminal 102-2 due to the channel estimation error. The inter-user interference power can be evaluated using the pilot signals (BLT) thus received, similar to the case in which the reception signal of the data portion is used.

Figure 28:
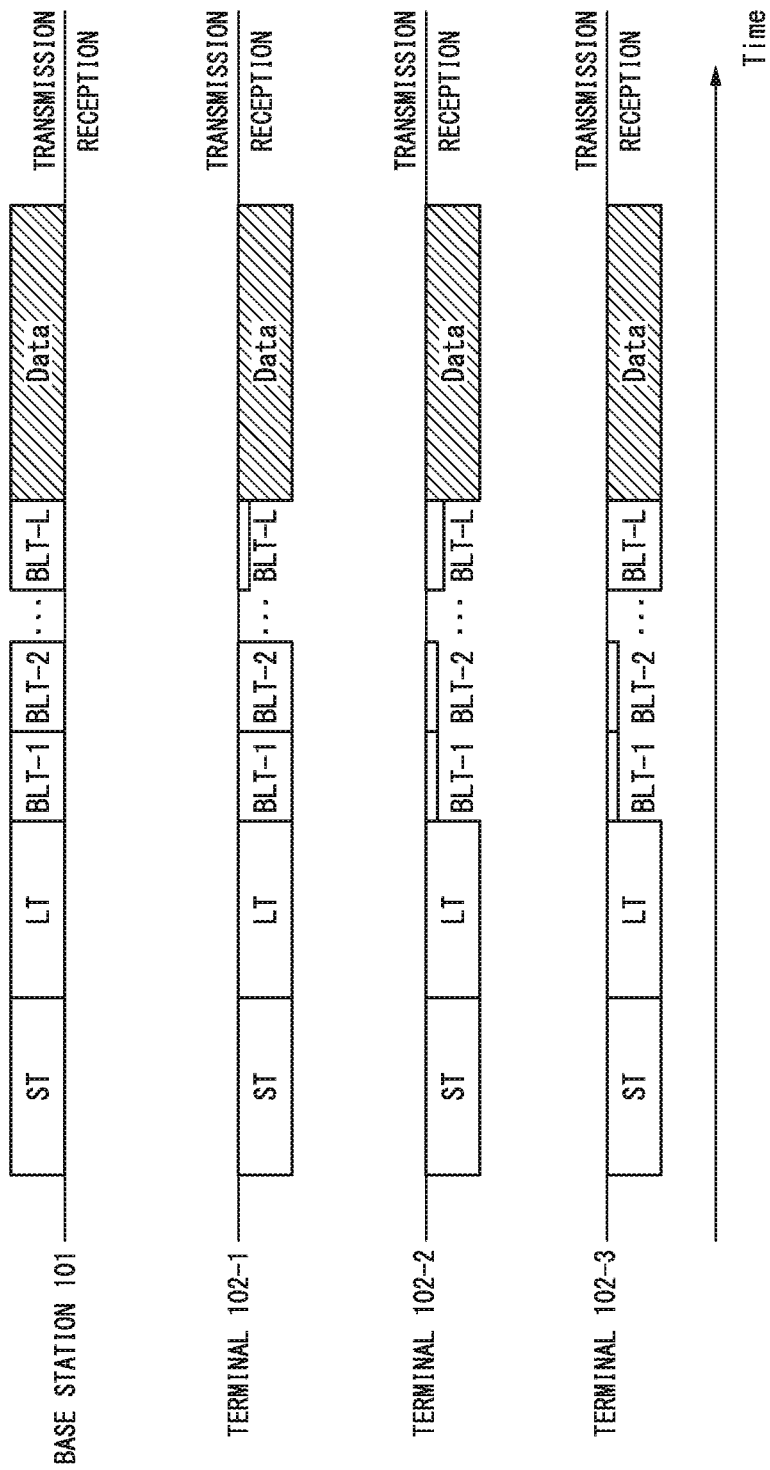
FIG. 28 is an illustrative diagram describing evaluation of inter-user interference using a pilot signal.

Furthermore, FIG. 28 is an illustrative diagram describing evaluation of inter-user interference using a pilot signal when a null signal terminal is selected from among communication party terminals. Here, BLT-1 and BLT-2 are pilot signals transmitted with transmission weights that are calculated under a condition of being orthogonal to signal spaces of the terminals other than the terminal 102-1, and BLT-L is a pilot signal multiplied by transmission weights that are calculated under a condition of being orthogonal to the signal spaces of the terminal other than the terminal 102-3. In FIG. 28, BLT transmitted under a condition of being orthogonal to a signal space of the terminal itself is not originally received, but the BLT is received due to the channel estimation error. The reception powers of the thus obtained pilot signals that have been subjected to calculation of transmission weights so that a null is directed to the terminal itself may be reported to the base station 101 as the inter-user interference power.

J. Tenth Embodiment

Figure 29:
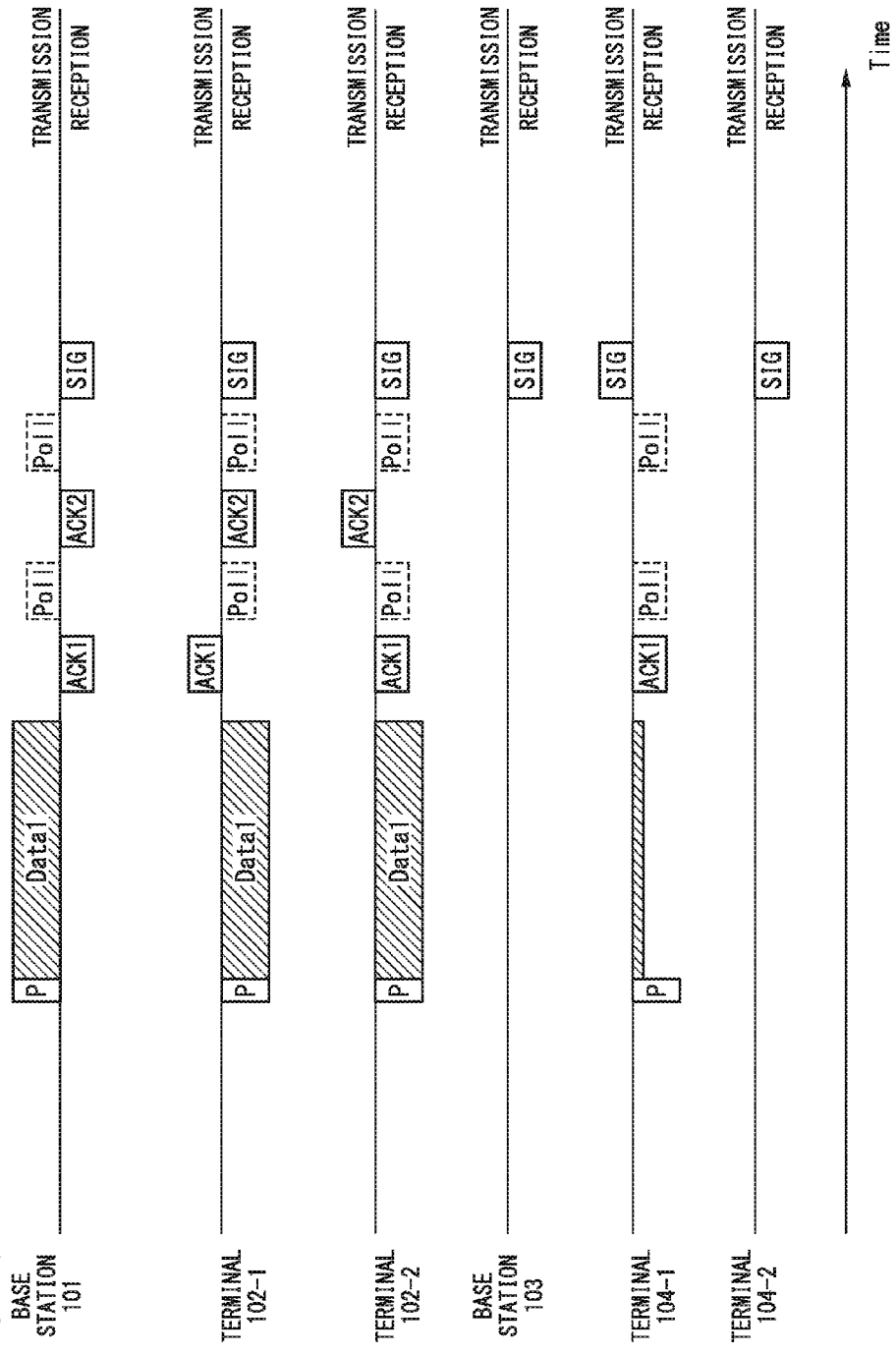
FIG. 29 is an illustrative diagram describing a communication method in a tenth embodiment of the present invention.
Figure 30:
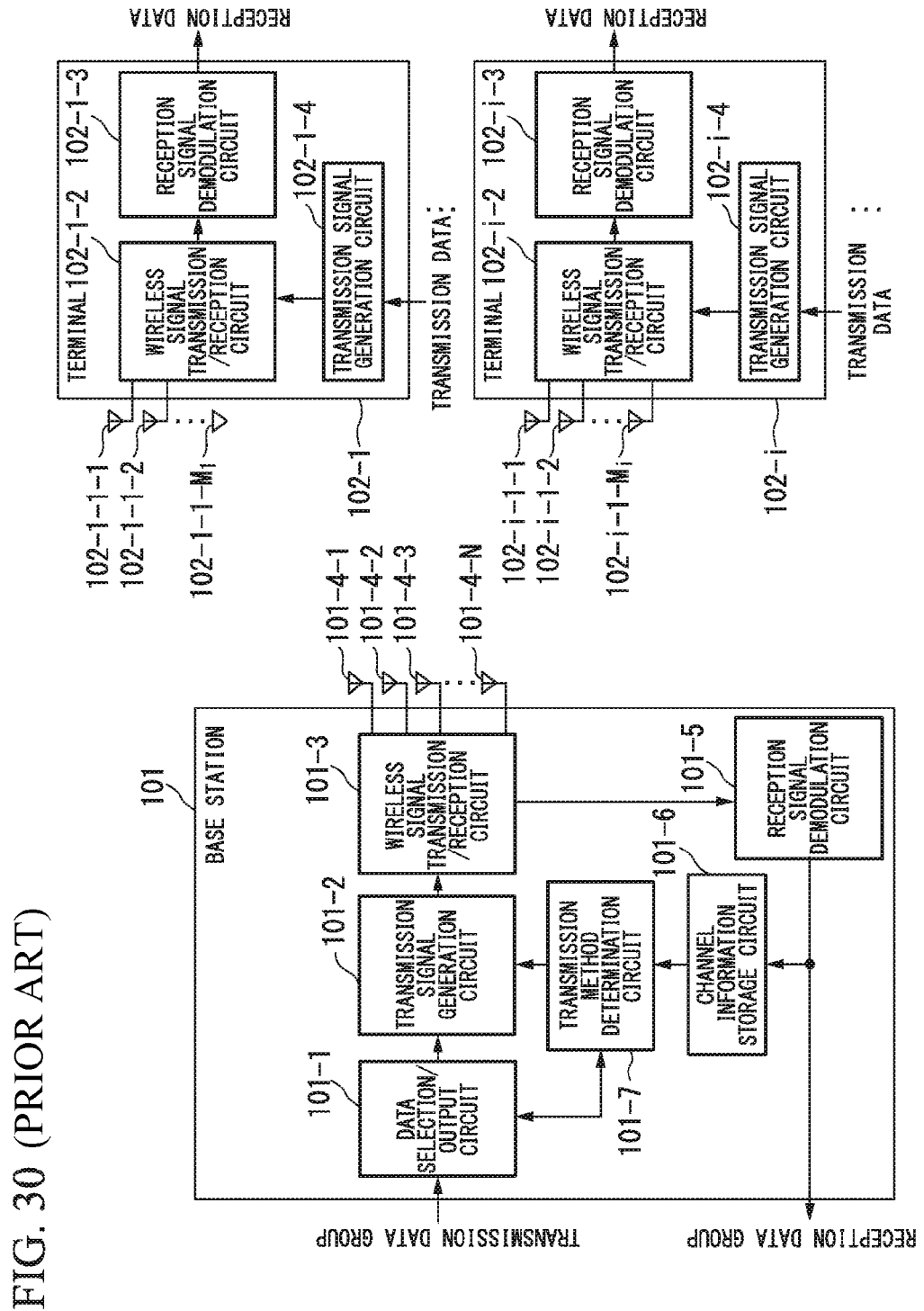
FIG. 30 is a schematic block diagram illustrating a configuration of a conventional transmission/reception system.

FIG. 29 is an illustrative diagram describing a communication method in a tenth embodiment of the present invention. In the tenth embodiment, another base station (hereinafter referred to as a base station 103) is present near the base station 101. It is assumed that the base station 101 communicates with the terminals 102-1 and 102-2 and the base station 103 communicates with terminals 104-1 and 104-2. The base station 103 and the terminals 104-1 and 104-2 are assumed to be similar to the base station 101 and the terminals 102-1 and 102-2 shown in FIG. 24. In this case, the base station 101 estimates channel information of the terminals 102-1 and 102-2 belonging to its own base station, as well as channel information of the terminal 104-1, from reception signals, and stores the channel information in the channel information storage circuit 101-6. When performing communication, the base station 101 includes the channel information between the base station 101 and the terminal 104-1 in a channel matrix when calculating transmission weights, and calculates the transmission weights for the terminals 102-1 and 102-2 so that a signal is not received by the terminal 104-1. Notification of the fact that the terminal 104-1 is a null signal terminal may be performed using a pilot signal represented by P. As in the ninth embodiment, the terminal 104-1 evaluates the interference power using the reception signal of a pilot signal portion or a data portion. After the evaluation, the terminal 104-1 makes a report by transmitting information indicating the interference power to the base station 101 and the base station 103 or to the base station 103. In FIG. 29, the terminal 104-1 puts the evaluation result of the interference power into a packet signal indicated by SIG in response to Poll transmitted by the base station 101, and transmits the packet signal. In this way, it is possible to evaluate how much of the interference power occurs in a terminal of the own cell when another cell is performing transmission while directing the null, and thus it is possible to transmit data to the terminals of the own cell during the other base station is performing transmission while directing the null to the terminal of the own cell. In the example of FIG. 29, since the base station 103 can know the interference power that occurs when the base station 101 directs the null to the terminal 104-1, the base station 103 can transmit a signal to the terminal 104-1 using a modulation scheme, a coding rate, and the number of spatial streams that are selected in consideration of the interference power from the base station 101 during the base station 101 is performing transmission while directing the null to the terminal 104-1.

While the embodiments of the present invention have been described in detail with reference to the drawings, a specific configuration is not limited to these embodiments and a design or the like without departing from the gist of the present invention is included.

INDUSTRIAL APPLICABILITY

The wireless communication system and the wireless communication method are provided that are capable of preventing communication quality from being deteriorated due to interference caused by low accuracy of channel information or interference from another base station or another wireless communication system. Furthermore, a wireless communication system is realized that determines whether or not simultaneous communication to a plurality of users is possible prior to communication or appropriately determines a modulation scheme, a coding rate, and the number of spatial streams when inter-user interference occurs in terminals.

DESCRIPTION OF REFERENCE SYMBOLS 1 base station
2-1 to 2-N antenna
3-1 to 3-3 terminal
4-1 to 4-3 antenna
10, 50 transmission signal processing unit
13, 51 D/A
14, 20, 52, 58 LPF
15, 53 quadrature modulator
16, 54 local signal generator
17, 55 circulator
18, 56 LNA
19, 57 quadrature demodulator
21, 59 A/D
23, 60 reception signal processing unit
30, 70 error correction coding unit
31, 71 interleaver
32, 72 mapping unit
33 transmission destination/null-directed terminal determination unit
34 transmission weight calculation unit
35 transmission weight processing unit
36, 73 inverse Fourier transform unit
37, 74 GI addition unit
38, 75 preamble addition unit
40, 80 synchronization unit
41 combining unit
42, 81 GI removal unit
43, 82 channel state estimation unit
44, 83 Fourier transform unit
45, 84 equalization unit
46, 85 demapping unit
47, 86 deinterleaver
48, 87 error correction decoding unit
61 reception power measurement unit
101 base station
102-1 to 102-$i$ terminal
101-1 data selection/output circuit
101-2, 102-1-4 to 102-$i$-4 transmission signal generation circuit
101-3, and 102-1-2 to 102-$i$-2 wireless signal transmission/reception circuit
101-4-1 to 101-4-N, 102-1-1-1 to 102-1-1-$M_i$, 102-$i$-1-1 to 102-$i$-1-$M_i$ transmission/reception antenna
101-5, 102-1-3 to 102-$i$-3 reception signal demodulation circuit
101-6 channel information storage circuit
101-7 transmission method determination circuit
101-8 null signal communication party storage circuit
101-9 interference power evaluation circuit
102-1-5 to 102-$i$-5 null signal determination circuit
102-1-6 to 102-$i$-6 interference power evaluation circuit

The invention claimed is:

1. A wireless communication system comprising:
a first wireless station including a plurality of antenna elements, transmission units corresponding to the plurality of antenna elements, and a transmission directivity control unit that controls transmission directivity of the plurality of antenna elements; and
a plurality of second wireless stations each including a reception power measurement unit that measures a reception power,
wherein the transmission directivity control unit of the first wireless station determines the transmission directivity of each of the plurality of antenna elements so that a signal does not reach a particular second wireless station among the plurality of second wireless stations,
the transmission units generate wireless signals using the transmission directivity,
the plurality of antenna elements transmit the generated wireless signals,
the reception power measurement unit of the particular second wireless station measures the reception power in a period that is set so that a signal does not reach the particular second wireless station, and estimates the presence or absence of interference,
the particular second wireless station transmits the presence or absence of the interference estimated by the reception power measurement unit to the first wireless station, and
the first wireless station determines at least one of a modulation scheme, a coding rate, or wireless stations with which transmission and reception are performed simultaneously through spatial multiplexing, and a frequency channel to be used, based on the presence or absence of the interference.

2. The wireless communication system according to claim 1, wherein the transmission directivity control unit periodically switches the particular second wireless station.

3. The wireless communication system according to claim 1, wherein the particular second wireless station further includes:
an interference estimation unit that estimates an interference amount; and
a transmission unit that transmits the interference amount estimated by the interference estimation unit to the first wireless station,
the second particular second wireless station transmits the interference amount estimated by the interference estimation unit, in place of the presence or absence of the interference, to the first wireless station, and the first wireless station determines at least one of the modulation scheme, the coding rate, or the wireless stations with which the transmission and the reception are performed simultaneously through the spatial multiplexing, and the frequency channel to be used, based on the interference amount.

4. The wireless communication system according to claim 1, wherein the plurality of second wireless stations each include:
a plurality of antenna elements; and
reception power measurement units corresponding to the plurality of antenna elements.

5. A wireless communication system comprising:
a first wireless station including a plurality of antenna elements, transmission units corresponding to the plurality of antenna elements, and a transmission directivity control unit that controls transmission directivity of the plurality of antenna elements; and
a plurality of second wireless stations each including a reception power measurement unit that measures a reception power,
wherein the transmission directivity control unit of the first wireless station determines the transmission directivity of each of the plurality of antenna elements so that a signal does not reach a particular second wireless station among the plurality of second wireless stations,
the transmission units generate wireless signals using the transmission directivity,
the plurality of antenna elements transmit the generated wireless signals, and
the reception power measurement unit of the particular second wireless station measures the reception power in a period that is set so that a signal does not reach the particular second wireless station, and detects the presence or absence of interference,
wherein the transmission directivity control unit determines the particular second wireless station based on the numbers of times a packet was not delivered in a given period in the plurality of second wireless stations.

6. A wireless communication system comprising:
a first wireless station including a plurality of antenna elements, transmission units corresponding to the plurality of antenna elements, and a transmission directivity control unit that controls transmission directivity of the plurality of antenna elements; and
a plurality of second wireless stations each including a reception power measurement unit that measures a reception power,
wherein the transmission directivity control unit of the first wireless station determines the transmission directivity of each of the plurality of antenna elements so that a signal does not reach a particular second wireless station among the plurality of second wireless stations,
the transmission units generate wireless signals using the transmission directivity,
the plurality of antenna elements transmit the generated wireless signals, and
the reception power measurement unit of the particular second wireless station measures the reception power in a period that is set so that a signal does not reach the particular second wireless station, and detects the presence or absence of interference,
wherein the transmission directivity control unit determines the particular second wireless station based on error rates in the plurality of second wireless stations.

7. A wireless communication system comprising:
a first wireless station including a plurality of antenna elements, transmission units corresponding to the plurality of antenna elements, and a transmission directivity control unit that controls transmission directivity of the plurality of antenna elements; and
a plurality of second wireless stations each including a reception power measurement unit that measures a reception power,
wherein the transmission directivity control unit of the first wireless station determines the transmission directivity of each of the plurality of antenna elements so that a signal does not reach a particular second wireless station among the plurality of second wireless stations,
the transmission units generate wireless signals using the transmission directivity,
the plurality of antenna elements transmit the generated wireless signals, and
the reception power measurement unit of the particular second wireless station measures the reception power in a period that is set so that a signal does not reach the particular second wireless station, and detects the presence or absence of interference,
wherein the transmission directivity control unit determines, as the particular second wireless station, a second wireless station for which application data to be transmitted is not stored among the plurality of second wireless stations.

8. A wireless communication method in which wireless communication is performed between a first wireless station including a plurality of antenna elements, transmission units corresponding to the plurality of antenna elements, and a transmission directivity control unit that controls transmission directivity of the plurality of antenna element, and a plurality of second wireless stations each including a reception power measurement unit that measures a reception power, the method comprising:
a step of determining, using the transmission directivity control unit in the first wireless station, the transmission directivity of each of the plurality of antenna elements so that a signal does not reach a particular second wireless station among the plurality of second wireless stations;
a step of generating, using the transmission units in the first wireless station, wireless signals using the determined transmission directivity, and transmitting the generated wireless signals from the plurality of antenna elements; and
a step of measuring, using the reception power measurement unit in the particular second wireless station, the reception power in a period that is set so that a signal does not reach the particular second wireless station, and estimating the presence or absence of interference,
a step of transmitting, using the particular second wireless station, the estimated presence or absence of the interference to the first wireless station, and
a step of determining, using the first wireless station, at least one of a modulation scheme, a coding rate, or wireless stations with which transmission and reception are performed simultaneously through spatial multiplexing, and a frequency channel to be used, based on the presence or absence of the interference.

9. A wireless communication system in which a base station performs simultaneous communication of data with a plurality of terminals using the same frequency, the base station comprising:

a data selection/generation unit that generates the data;

a null signal terminal determination unit that determines, when there is a terminal for which an interference power needs to be evaluated, the terminal as a null signal terminal;

a first reception unit that receives a signal transmitted from the null signal terminal and acquires interference power information;

a transmission method determination unit that determines a transmission weight, a modulation scheme, and a coding scheme based on channel information of a terminal that is a communication party and the interference power information acquired from the null signal terminal;

a data selection/output unit that selects transmission data destined for the terminal that is the communication party from among data to be transmitted and outputs the transmission data; and a first transmission unit that transmits the transmission data using the determined modulation scheme, coding scheme, and transmission weight, and each of the terminals comprising:

a second reception unit that receives the transmission data as a reception signal;

a reception signal demodulation unit that performs detection, synchronization, and decoding of the reception signal;

a null signal determination unit that determines that each of the terminals itself is the null signal terminal based on an output of the reception signal demodulation unit;

an interference power evaluation unit that measures a reception power of a null signal portion and records the reception power as an interference power when each of the terminals itself is determined to be the null signal terminal; and a second transmission unit that modulates, codes, and transmits information on the interference power.

10. The wireless communication system according to claim 9, wherein the null signal terminal determination unit in the base station determines, as the null signal terminal, a terminal communicating with another base station adjacent to the base station, and the second transmission unit in each of the terminals modulates and codes the information on the interference power and transmits resultant information to the base station communicating with each of the terminals.

11. The wireless communication system according to claim 9, wherein the null signal determination unit determines that each of the terminals itself is the null signal terminal when a reception signal power of a data portion is smaller than a reception power of a pilot portion by an amount that is greater than or equal to a predetermined reference.

12. The wireless communication system according to claim 9, wherein the base station includes:

a null signal ID notification unit that assigns a bit for specifying the null signal terminal as a null signal ID to a pilot signal in advance, and notifies a terminal as a candidate for the null signal terminal of the corresponding null signal ID;

a downlink transmission unit that specifies the null signal ID when the pilot signal is added to the transmission data; and a null signal determination unit that determines that each of the terminals itself is the null signal terminal based on the null signal ID specified by the pilot signal of the reception signal.

13. The wireless communication system according to claim 9, wherein the null signal terminal determination unit specifies another base station as the null signal terminal.

14. The wireless communication system according to claim 9, wherein the null signal terminal determination unit specifies, as the null signal terminal, a terminal that has not been selected as the null signal terminal for a given period, a terminal that has not performed multiplexing communication with a plurality of terminals using the same frequency for a given period, or a terminal that has not been able to successfully perform communication when performing multiplexing communication with a plurality of terminals using the same frequency.

15. The wireless communication system according to claim 9, wherein the interference power evaluation unit measures the reception power of the null signal portion at two or more timings, and records information on an increase amount of the interference power, and the second transmission unit modulates, codes, and transmits information on the interference power and the information on the increase amount of the interference power or information on an interference power obtained by applying a function to the interference power and the increase amount of the interference power.

16. The wireless communication system according to claim 15, wherein the data selection/output unit calculates a duration in which the interference power does not exceed a predetermined maximum interference power based on the information on the interference power and the information on the increase amount of the interference power estimated for a terminal, and determines the maximum data length that is able to be set for the terminal.

* * * * *